Feb. 22, 1966 J. WOULBROUN 3,236,574
APPARATUS AND METHOD FOR RETRIEVING STORED INFORMATION
Filed Oct. 15, 1963 11 Sheets-Sheet 1

INVENTOR
JULES WOULBROUN

BY Kemon and Palmer
ATTORNEY

INVENTOR
JULES WOULBROUN

BY Kemon and Palmer
ATTORNEY

INVENTOR
JULES WOULBROUN
BY Kemon and Palmer
ATTORNEY

INVENTOR
JULES WOULBROUN
BY
Kemon and Palmer
ATTORNEY

Feb. 22, 1966 J. WOULBROUN 3,236,574

APPARATUS AND METHOD FOR RETRIEVING STORED INFORMATION

Filed Oct. 15, 1963 11 Sheets-Sheet 5

INVENTOR
JULES WOULBROUN

BY Kemon and Palmer
ATTORNEY

APPARATUS AND METHOD FOR RETRIEVING STORED INFORMATION

Filed Oct. 15, 1963

INVENTOR
JULES WOULBROUN

BY Kenyon, Palmer, Stewart & Estabrook

ATTORNEYS

APPARATUS AND METHOD FOR RETRIEVING STORED INFORMATION

Filed Oct. 15, 1963 11 Sheets-Sheet 7

INVENTOR
JULES WOULBROUN

BY Kenyon, Palmer, Stewart & Estabrook
ATTORNEYS

Feb. 22, 1966 J. WOULBROUN 3,236,574

APPARATUS AND METHOD FOR RETRIEVING STORED INFORMATION

Filed Oct. 15, 1963 11 Sheets-Sheet 8

INVENTOR
JULES WOULBROUN

BY Kenyon, Palmer, Stewart & Estabrook

ATTORNEYS

INVENTOR
JULES WOULBROUN

BY Kenyon, Palmer, Stewart & Estabrook
ATTORNEYS

INVENTOR
JULES WOULBROUN
BY Kemon, Palmer, Stewart & Estabrook
ATTORNEYS

APPARATUS AND METHOD FOR RETRIEVING STORED INFORMATION

INVENTOR
JULES WOULBROUN

BY Kenyon, Palmer, Stewart & Estabrook

ATTORNEYS

United States Patent Office 3,236,574 Patented Feb. 22, 1966

3,236,574

APPARATUS AND METHOD FOR RETRIEVING STORED INFORMATION

Jules Woulbroun, 432 Belden Hill Road, Wilton, Conn.
Filed Oct. 15, 1963, Ser. No. 317,401
16 Claims. (Cl. 312—183)

This application is a continuation-in-part of my copending application Serial No. 110,302, filed May 9, 1961 (now abandoned), which is in turn a continuation-in-part of my application Serial No. 838,930, filed September 9, 1959 (now abandoned).

This invention relates to an apparatus for and method of retrieving stored information. More particularly it concerns such a method and apparatus highly suitable for use in selecting specific cards out of those stored in card filing systems of the type both wherein a plurality of cards are hingedly mounted on a supporting tray and disposed normally in horizontal overlapping relation to present an exposed margin at each forward edge respectively and wherein a plurality of cards are super-posed and preferably, but not necessarily placed on a ring-type holder or binder. In its broadest sense the invention is applicable to other filing systems wherein information is to be retrieved from storage on filed records regardless of the specific size, shape or form.

In present day commercial, governmental and other office operations, the need for efficient and reliable filing systems by which information may be stored for future use is manifested by the availability of extremely large, complex, expensive, electronic or mechanical machines. While such machines are, of course, highly efficient and fully satisfy the purposes for which they are designed, the cost of this variety machinery is prohibitive to smaller business operations. In fact, it is prohibitive to larger operations to the extent that it has been, and to some extent, still is common practice for the manufacturers of such machines to lease rather than sell their equipment to using firms and organizations. As a result of these high costs, the smaller type commercial operations are required to resort to the use of manually operated simple filing systems in which to handle information storage and retrieval.

One of the most prevalent and perhaps most efficient methods of storing business records, particularly where the records involved have to do with personnel or individual subject, for example, involves the use of card indices. Generally, a card is prepared for each individual subject and placed in an indexing system to facilitate assessibility thereto at any subsequent time for business or other operations. Further, as the activity progresses, various cards may become inactive and removed from the index to be either stored or destroyed, while at the same time the cards of newly active subjects can be made up and inserted into the index. Card filing systems of the type having a plurality of cards hingedly mounted on a supporting tray such that the cards are disposed in overlapping relation to present an exposed margin at each forward edge respectively are especially desirable in this respect, particularly since they enable the storing of a maximum of information and yet require a minimum of space.

One of the advantages of filing systems of the type referred to is due to the fact that a visible margin is left at the forward edge of each card, on which margin the name of a person or subject to which the card applies, for example, or other basic indexing criteria may be made to appear so that in use, the operator is required to be concerned only with that information which appears on the margin to select the card of any particular subject. However, when a user or operator is confronted with a large bank of such cards, as is frequently the case, it is extremely difficult to quickly scan the marginal edges of the cards in order to pick up only those cards which relate to a particular set of informational criteria. The reason for this is that in commercial or other operations, the situation often develops where the criterion forming the basis of card selection does not appear on the marginal edge, principally because there is not sufficient room on the margin to write or otherwise indicate all of the information forming the bases of selectivity for subsequent retrieval.

Another filing system to which this invention is applicable is the type having a plurality of cards stored in superposed relationship on a ring-type holder or binder or other container and which, through information stored by the location and shape of punched holes in the card, may be laterally moved to expose one of the vertical edges thereof through the use of an actuator disposed through the punched holes and moved in the required direction. After actuation of the cards, the cards carrying the desired information, as determined by those having exposed edges, may be selected.

The problems aforementioned have not been without attempted solutions. For example, one manner of overcoming the problem concerning storage of additional criteria for subsequent selectivity on the marginal edges of the cards has been to use a plurality of different colored tabs. In other words, the color of the tab is chosen to conform with some particular bit of information recorded on the unexposed face of the card such that in use the operator may merely look at the color of the various tabs and go directly to the desired card. In practice, however, the user is still faced with the entire bank or tray of cards and must use a considerable amount of optical and mental dexterity to select the proper card without error.

The above-mentioned examples of prior attempts to solve the problems incurred with simple, low-cost filing systems are by no means inclusive of all the attempts which have been made in this field of endeavor, but are merely representative of what has been done in this respect. Many other mechanisms have been developed to overcome these problems, but in each case either specially designed cards are required or other disadvantages such as mutilation of the cards or the like are incurred.

A principal object of the present invention is the provision of a new and improved information retrieval device particularly adapted for use in filing systems of the type having a plurality of cards hingedly mounted on a support. Further objects include I. The provision of card selecting apparatus for card filing systems of the type referred to whereby the marginal edges of all but those cards in a bank or tray which have the desired criterion recorded thereon are hidden from the view of the operator, and thus eliminated from consideration.

II. The provision of a card selecting mechanism for use in filing systems of the indicated type which permit the use of unmodified standard index cards.

III. The provision of card selecting devices of the type referred to which are highly effective and substantially automatic in operation while at the same time not requiring the use of any electrical apparatus.

IV. The provision of card selecting apparatus for filing systems of the type referred to which is easily adjusted to provide desired card selectivity and as well, easily manipulated during the card selecting operation.

V. The provision of card selecting means for filing systems of the type referred to which are readily adaptable to conveniently proportioned trays, which trays in turn may be mounted in a storage cabinet.

VI. The provision of a new and improved method for the retrieval of stored information in superposed perforated cards.

VII. The provision of card selecting apparatus of the type referred to provided with a master indicating means to facilitate use in storage cabinets.

VIII. The provision of card selecting apparatus of the type referred to which functions to select predetermined cards in a tray and as well, to provide an indication, when the trays are arranged in a cabinet, of which trays have desired cards therein.

IX. The provision of a system for information retrieval which is simple to operate, low in initial cost, fast and quick in operation, adaptable to many types of businesses and a wide variety of uses, and easy and inexpensive to maintain and use.

X. The provision of a new and improved method for the retrieval of stored information which greatly reduces the chance of human error as well as the need for skilled clerical personnel.

XI. The provision of a system for storage of changeable information in punch-type cards.

XII. The provision of new and improved holder devices for superposed card-type information retrieval systems.

XIII. The provision of a new and unique card and card envelope structure for superposed card-type retrieval systems.

Other objects and further scope of applicability of the present invention will become apparent from the detailed description given hereinafter. It should be understood, however, that the detailed description, while indicating preferred embodiments of the invention is given by way of illustration only, since it will become apparent to those skilled in the art from this description that various changes and modifications can be made without departing from the spirit and scope of this invention.

In general, the aforementioned objects are accomplished by a plurality of records such as cards, film, disks or the like adapted to have stored thereon information criteria falling under various categories and sub-categories. Associated with each of the records is an indicating means either in form of a separate movable indicator or signal device, or in the form of record movement, which indicating means may be operatively associated by way of an actuating means with a selecting device corresponding to a particular criterion in such a manner that upon operation of the selecting device, the indicating means is actuated for all records except those having the selected criterion recorded thereon. Then, if desired, further selection of records for sub-criteria falling within the category of the first-mentioned criterion may be effected by actuation of indicating means previously left unactuated by another selecting device corresponding to the sub-criteria. In one embodiment of the invention, the records are in the form of index cards arranged in uniform overlapping relationship on a tray or other suitable carrier so that a telltale marginal portion of each card is exposed to view. In this manner, the provision of indicating means is facilitated since it may take the form of a blind movable over at least a portion of the exposed margin or, if the cards themselves are moved, the movement thereof will be most noticeable in the area of this exposed portion.

Further, each tray of cards is provided with an indicating mechanism which informs the user as to whether the tray under observation contains any cards having the desired criterion recorded thereon. Accordingly, when a plurality of such trays are arranged in a cabinet equipped with a master actuating means to operate respective tray selectors, the user will be informed as to which trays have cards containing the desired criterion merely by observing the indicating means, thus eliminating the necessity of checking all of the trays in the cabinet.

In another embodiment of the invention, the records are in the form of punch cards arranged in superposed relationship on a tray or other suitable carrier so that none of the marginal portions of the cards are exposed to view. Each of the punched apertures in the cards align with the succeeding card thereto so that an actuator pin or the like may be inserted through the apertures for the entire stack of cards. Information is recorded on the cards by suitable adjustment of the location of the apertures so that, upon actuation of the selecting device, only the cards having the adjusted or the non-adjusted apertures are moved to expose a telltale marginal portion thereof.

A more complete understanding of the new improved information retrieval devices of this invention and their operation may be had by reference to the accompanying drawings in which.

Figures 1, 2:
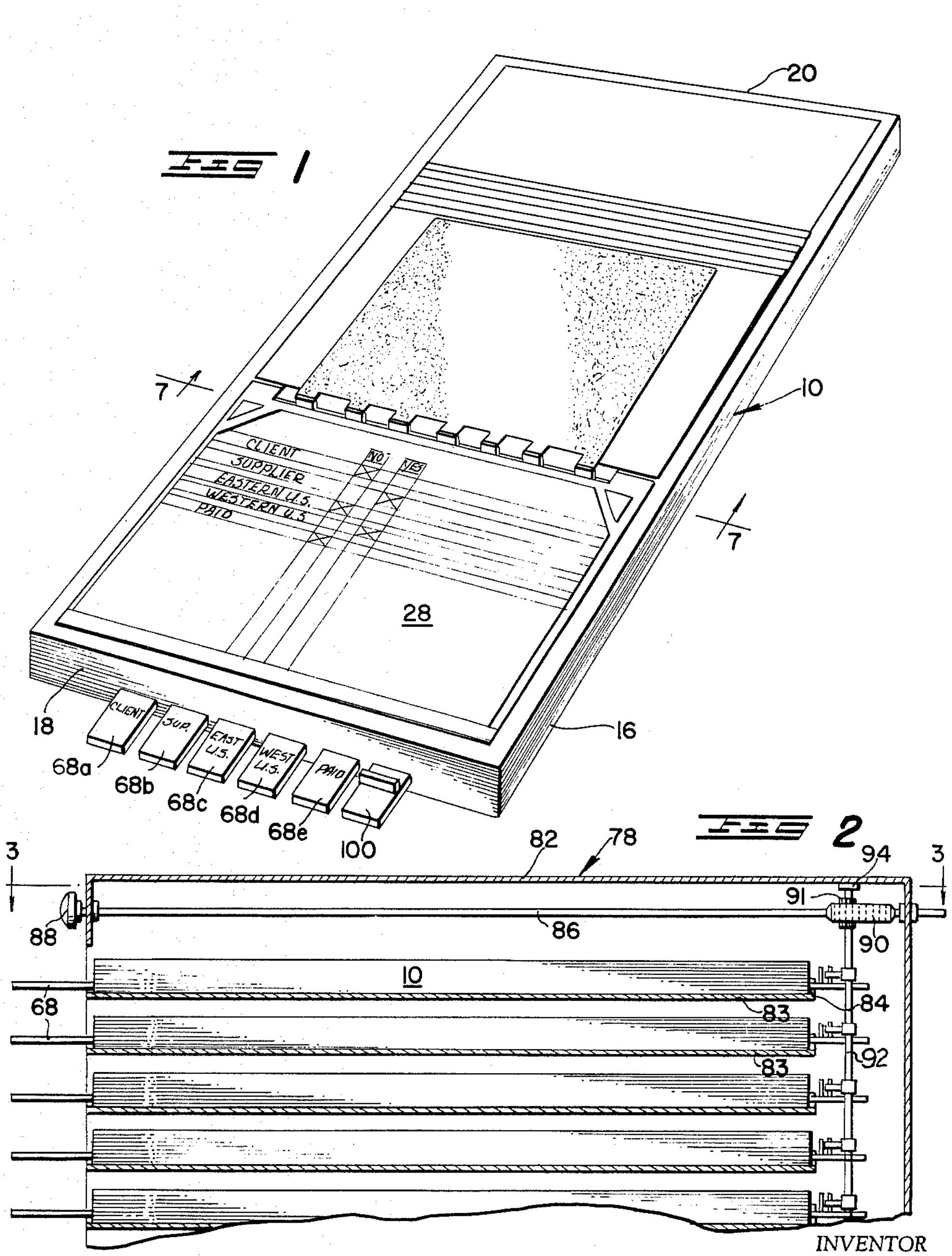
FIG. 1 is a perspective view of a tray equipped with the card indicating apparatus depicting one form of the information storage and retrieving apparatus making up this invention.
FIG. 2 is a fragmentary side elevation in partial section showing an arrangement of the trays shown in FIG. 1 in a cabinet equipped with a master actuating mechanism.
Figure 7:
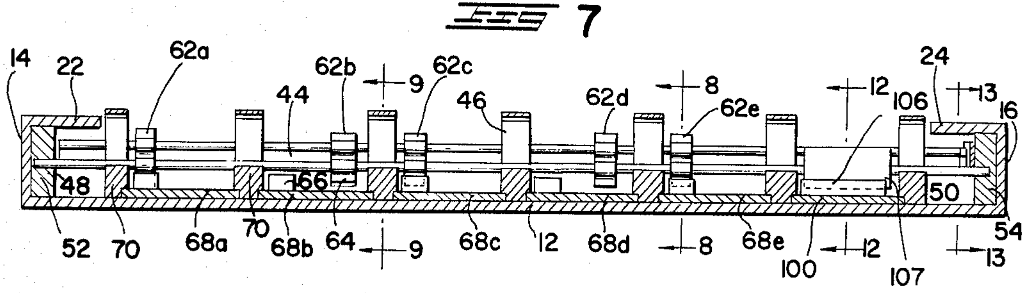
FIG. 7 is a cross sectional view taken along lines 7—7 of FIG. 1 illustrating one form of the actuating mechanism of this invention.
Figure 8:
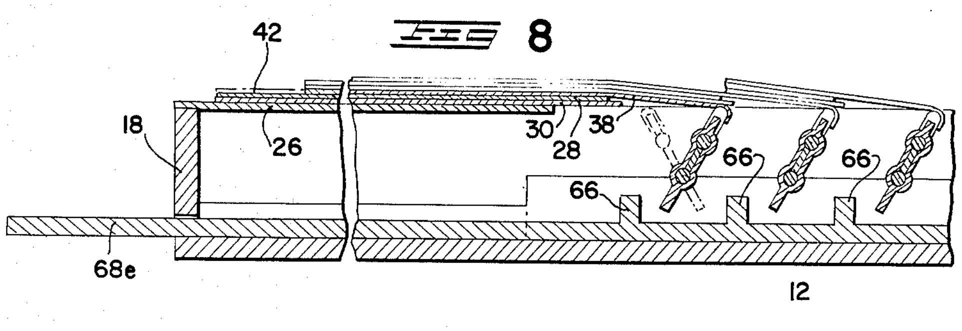
FIG. 8 is an enlarged fragmentary cross sectional view taken along lines 8—8 of FIG. 7.

One form of the individual card holding trays suitably adapted for use with the card indicating apparatus of this invention are generally designated by the numeral 10 in the drawings and a complete understanding of the tray structure may be had by reference to Figs. 1, 7 and 8. As shown in these figures, each tray 10 is formed having a bottom 12, sidewalls 14 and 16, and front and rear walls 18 and 20 respectively. A pair of inwardly extending ledges 22 and 24 are provided at the top of the walls 14 and 16 respectively, and a similar, but substantially larger, ledge 26 is provided across the front portion of each tray.

A plurality of cards 28 having recorded information written or printed thereon are arranged to be mounted on the tray 10 through the provision of card holders 30. While the use of such card holders is especially desirable for the reason that it permits the mounting and demounting of cards without in any way marking or mutilating the cards for mounting purposes only, it is to be understood that the indicating mechanism of this invention may be used by mounting the cards directly to the tray. Each of the card holders 30 is formed having a pair of rearwardly extending tabs 32 to permit securement thereof to the ledges 22 and 24 extending along the upper edges of the trays by use of a suitable adhesive, staples, or like fastening means. In all other respects, the card holders 30 are conventional and formed in a manner well known in the art having a plurality of slots 34 for receiving the corners of a card to be mounted therein substantially as shown in Fig. 1. Also, the card holders are provided at their leading edge with a doubled back lip 36 of transparent material such as cellophane, or celluloid or the like, such that the card may be retained thereunder. Further, when the cards are arranged in horizontal overlapping relation such that all of the card except the forward marginal edge thereof is covered by the next succeeding card, this cellophane lip 36 serves to protect the exposed marginal edge. Thus, through this arrangement of cards, when it is desired to inspect the face of any particular card, those cards above and to the rear of it are merely pivoted upwardly and back in a manner that is well known to one familiar in this art. As many cards as is desired may be mounted on any particular tray, though the maximum number of cards and card holders is limited by the respective size of cards and as well as size of tray used.

One of the more salient features of this invention is the provision of an indicating means for each of the cards 28 which in this instance includes a signal device or blind 38 which, in turn, may be of any translucent or opaque material having sufficient rigidity to permit sliding movement in its position over and beneath the cards 28 and card holders 30, respectively. Generally, such materials as a relatively thick or a medium gauge paper, celluloid or other synthetic plastic material will suffice. Each blind is formed in a generally rectangular shape and having at its rearward edge a plurality of tabs 40 for attachment to an operating mechanism which will be described more fully hereinafter. Although the blinds 38 may be made varied in size, e.g., in width, the dimensions of the blinds 38 are preferably such that they substantially cover the cards 28 and the combined functions of the reciprocal movement of the blinds 38 and the depth thereof are such that when they are in their rearwardmost position as indicated in FIG. 8, the marginal edge 42 of the card 28 immediately thereunder is exposed. When, however, the blind 38 is moved to its forwardmost position as indicated in the phantom lines of FIG. 8, the margin of the card thereunder is covered by the blind. It will be understood that to more clearly illustrate this invention, the operational characteristics of only one blind will be covered herein though it is essential for realization of the invention's beneficial results, that a blind 38 be provided over each card 28 mounted in the tray 10.

Figure 5:
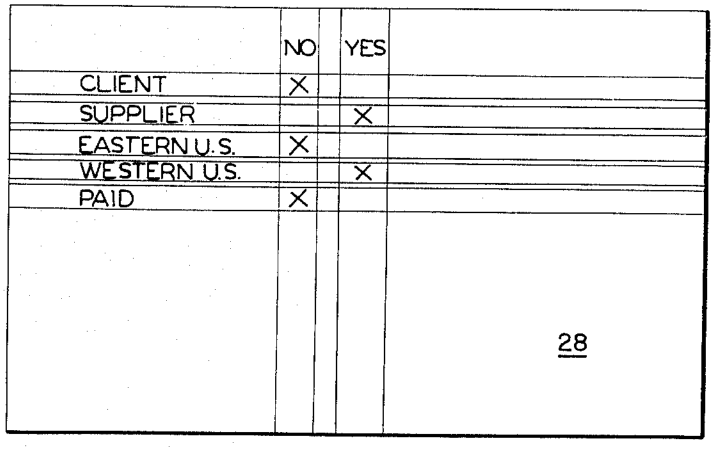
FIG. 5 is a plan view illustrating a card adapted to be used with this invention.
Figure 6:
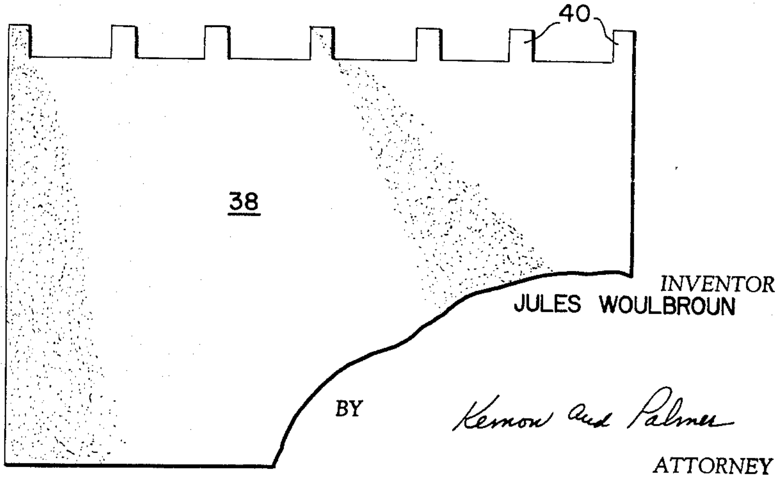
FIG. 6 is a fragmentary plan view of a blind adapted to be used in one embodiment of this invention.

For purposes of facilitating the description and thus understanding of the present invention, each of the cards 28 is printed to indicate certain specific informational criterion as indicated by the words, "Client," "Supplier," "Eastern U.S.," "Western U.S." and "Paid," and with a pair of columns adjacent these words headed by the words "No" and "Yes" respectively. However, the particular criteria shown on the cards as illustrated in FIGS. 1 and 5 of the drawings are merely exemplary of the manner in which the indicating apparatus of this invention functions and any other types of criterion or arrangements thereof may be adapted to the apparatus of this invention. As indicated by the check mark under the "No" and "Yes" columns, the sample card illustrated in FIGS. 1 and 5 is set up to correspond with a supplier from the western half of the United States who has not been paid and the card arranged alphabetically, for example, in a tray or trays according to the name of firm or person to which it relates.

Figure 14:
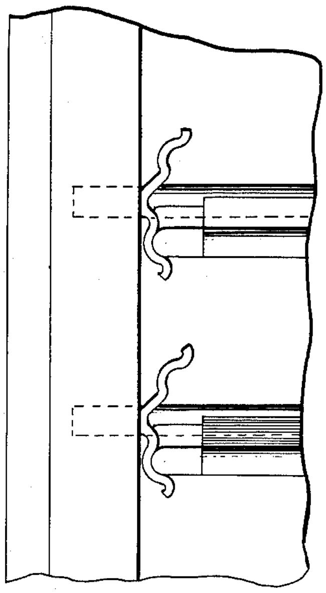
FIG. 14 is an enlarged plan view of the mechanism illustrated in FIG. 13.
Figure 13:
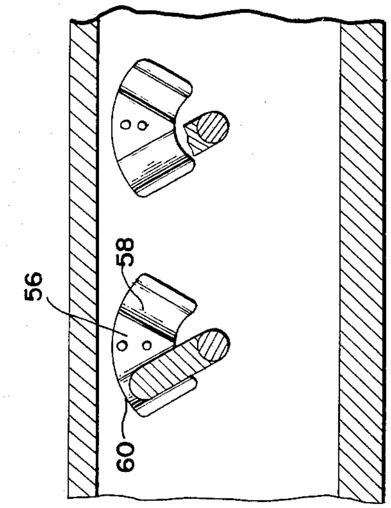
FIG. 13 is an enlarged side elevation in partial cross section taken along lines 13—13 of FIG. 7.

The indicating means includes further a transversely extending pivotable or oscillatable blade 44 having upstanding leverage tabs 46 thereon to which the tabs 40 on the blinds 38 are connected and corresponding in number to the number of tabs 40 on each of the blinds 38. The lower side of the blade 44 terminates at its ends in a pair of bearing shafts 48 and 50 journaled in bearing strips 52 and 54, positioned immediately inside the tray sidewalls 14 and 16 respectively. Also, at least one end of the blades 44 is arranged to engage a resilient spring detent member 56, nailed, bolted, or otherwise secured to the bearing strip 54. The details of the detent spring are shown in FIGS. 13 and 14 and accordingly, each of the springs 56 is provided with a pair of detents 58 and 60 converging on the pivotable axis of the blade 44 or the axes of shaft extensions 48 and 50. The function of the detent springs 56 is to retain the blades 44 in either a forward or rearward position, the importance of which will be more fully appreciated hereinafter.

Adjustable actuating means in the form of plurality of blind actuating tabs in the embodiment are slidably mounted on each of the blades 44, which tabs are generally designated by the numerals 62*a*, 62*b*, 62*c*, 62*d* and 62*e*. Each of these blind actuating tabs is arranged to oscillate with their respective blades 44 and are provided with a downwardly extending portion 64. The downwardly extending portion 64 on each of the actuating tabs is arranged to be engageable by an upstanding lug 66, provided on each of a plurality of selecting devices in the form of sliding bars or push rods designated by the numerals 68*a*, 68*b*, 68*c*, 68*d* and 68*e*. The lugs 66 are preferably formed integrally on each of the push rods or slides 68 and are spaced thereon at a distance substantially equal to the distance between the respective oscillatable blades 44 for each blind 38. Further, it will be noted that these lugs are located at one side or to the left of the slides 68 as viewed in FIGS. 8 and 10 for reasons which will become apparent from the description below. Further, to limit sliding movement of the actuating tabs 62, projections or dimples 69 are provided at proper points along each of the blades 44.

The push rods are slidingly positioned against the bottom of the tray 12 by a plurality of guides 70 having recesses at their lower edge to slidingly receive each of the slides 68 respectively. Also, the upper edge of the guides 70 are provided with channeled out portions 72 to receive the lower edge of each of the blades 44, thus giving the blades stability about their pivotal axis completely across the width of the tray 10.

Figure 10:
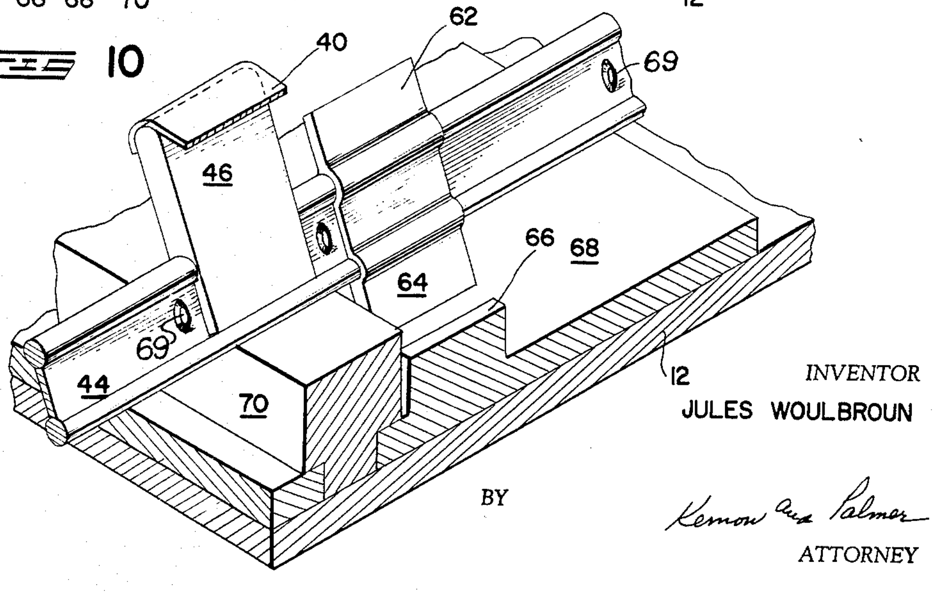
FIG. 10 is an enlarged fragmentary perspective view illustrating one form of the basic blind actuating components of this invention.

The operation of the blind operating mechanism can be generally understood by referring to FIG. 10. As shown, the blind actuating tab 62 is positioned to the left of its extent of sliding travel on blade 44 as limited by the projection 69. In this position, the downwardly extending portion on the tab 62 is arranged to be engaged by an upwardly extending lug 66 on the push rod 68 when the latter is moved rearwardly with respect to the tray or generally to the left as seen in FIG. 10. Upon such movement, the lug 66 moves the downwardly extending portion 64 rearwardly, thus effecting pivotal movement of the blade 44 about its lower edge, moving the upstanding member 46 to which the blind tabs 40 are attached forwardly. Correspondingly, the tab 40 and blind 38 of which it is a part is moved forwardly with respect to the tray.

Applying this basic principle of operation of the specific form of the invention as illustrated in FIGS. 1 through 10, it will be noted first that a selecting device or push rod 68 is provided corresponding to each of the aforementioned criterion appearing on the cards 28. In other words, as indicated in FIG. 1, the push rod 68*a* corresponds to the word "client"; push rod 68*b* corresponds to the word "supplier"; push rod 68*c* corresponds to "Eastern U.S."; push rod 68*d* corresponds to the word "Western U.S."; and push rod 68*e* corresponds to this word "Paid." Similarly, the actuating means, in this instance in the form of the blind actuating tabs 62*a*, 62*b*, 62*c*, 62*d*, 62*e* correspond to the words or informational criterion appearing on the cards 28. To facilitate the adjustment of the tabs 62 with respect to the push rods 68, these members may be, if desired, provided with appropriate colors. In this fashion, there will be no confusion as to which tabs apply to which push rods and vice versa.

In order to render the card 28 and criterion recorded thereon operative in the card selecting apparatus of this invention, upon placing the card in the card holder 30, the operator adjusts the blind actuating tabs 62 to conform with the information recorded on the card which in turn is placed immediately below the blind actuated thereby. This adjustment is made in the following manner. Since the person or firm to which the card 28 applies is not a client, but a supplier, the blind actuating tab 62*a* is positioned to the left as seen in FIG. 7 so as to be engageable with the push rod 68*a* while the blind actuating tab 62*b* is moved to the right or not engageable with the upstanding lug 66 on the push rod 62*b*. Similarly, since the supplier is not located in the Eastern U.S. but is located in the Western U.S., the blind actuating tab 62*c* is moved to the left so as to be engageable with the upstanding lug 66 on the push rod 68*c* while the blind actuating tab 62*d* is moved to the right so as to be not affected by movement of the push rod 68*d*. Also, since in this particular instance the supplier has not been paid, the blind actuating tab 68*e* is moved to the left as indicated in FIG. 7 so as to be engageable by the lugs 66 on the push rod 68*e*. Preferably, the actuating tabs 62 will be initially positioned to the left or on that side on which they engage the lugs 66. In this manner, when no adjustment is made such as when the criterion is added to the card, the margin will be covered upon subsequent actuation of the push rods and properly so.

Having thus allocated the respective blind actuating tabs 62 with respect to the unstanding lugs 66 on the various sliding push rods 68, it will be understood that initially all of the indicating means are positioned in an inoperative position; or, in this form of the invention, all of the blinds are positioned rearwardly of the exposed marginal edge of the cards as indicated in FIG. 8. Assuming for example that the operator desires to examine all cards in the tray 10 which relates to suppliers located in the western half of the United States who have been paid, he begins by pushing the supplier slide inwardly towards the rear of the tray 10. In this particular instance, the supplier push rod is push rod 68*b*. Since the card 28 pertains to a supplier, the blade corresponding thereto will remain unmoved and the blind positioned thereover will be left in its rearwardly disposed position since the actuating tab 62*b* is not engageable by the upstanding lugs on the push rod 68*b*. This same situation will exist for all other cards which relate to suppliers. If, however, a card relates to a client and correspondingly the blind actuating tab therefor has been properly adjusted, it will be moved through movement of the push rod 68*b* and in turn moving the blind immediately thereover forward to cover its marginal edge. Thus, all of the cards in the tray, except those which relate to suppliers now have their marginal edges covered by the blinds 38.

The operator then, desiring to know which cards relate to suppliers in the Western United States, pushes the push rod 68*d*. Having thus moved the push rod 68*d* to its rearward position with respect to the tray 10, the marginal edges of all cards in the tray are covered except those which relate to suppliers located in the Western United States. Finally, desiring to know which of those suppliers in the Western United States that have been paid, the operation pushes push rod 68*e* inwardly toward the rear of the tray. For the particular card shown in this particular example, the supplier has not been paid as indicated by the check mark in the "No" column. Accordingly, the blind actuating tab 68*e* has been moved to the left so as to be engaged by the lug 66 on the push rod 68*e*. Thus, upon actuating the push rod 68*e*, the blind 38 covering the card 28 will be moved forwardly as shown by the phantom lines in FIG. 8 to cover the marginal edge 42 thereof. Hence, the only cards in the tray 10 which will be left having their marginal edges exposed will be those cards which relate to persons or firms who are suppliers located in the Western United States who have been paid. The marginal edges of all other cards in the tray will have been covered during the preceding operation by the blinds positioned thereover.

In view of the foregoing, it now becomes apparent to one familiar in this art that highly effective information retrieval devices are provided by this invention. After operating the push rods 68 in the manner aforementioned, the operator need be concerned only with the cards whose marginal edges are exposed, all other being eliminated from his consideration. Thus, the probability of human effort is reduced to an absolute minimum. Also, it will be noted from the foregoing description that while the particular arrangement of cards and blinds is desirable, the basic concept thereof is applicable to any system wherein a plurality of records are positioned uniformly with respect to each other and including a plurality of selectively movable indicating means (the pivotal blades and blinds in the form described) initially positioned uniformly with respect to each other, one of the indicating devices corresponding to each of the records so that by moving out of their initially uniform position the indicating devices corresponding to all records except those desired, the selected records will be properly indicated.

Figure 11:
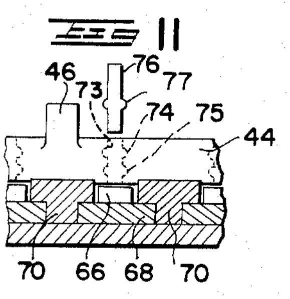
FIG. 11 is a partial front elevation showing a modification of the actuating components of FIG. 10.
Figure 9:
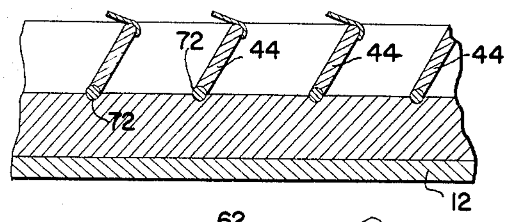
FIG. 9 is an enlarged fragmentary cross sectional elevation taken along lines 9—9 of FIG. 7.

A preferred modified arrangement of the actuating means usable with the embodiment described is shown in FIG. 11 of the drawings, for actuating the blinds 38 in the manner explained above though this invention contemplates a number of such modifications. In this instance, the oscillatable blades 44 are provided with a plurality of bores 73 having a pair of internal detents 74 and 75. Each of the bores 73 is centered in a vertical plane passing through the lugs 66 on push rods 68 and is adapted to receive a pin 76 having a pair of laterally projecting portions 77 thereon.

Thus, the pins 76 in this modification function basically in the same manner as the blind actuating tabs 62 of the embodiment of FIGS. 1 to 10. To render them operative with respect to the push rod lugs 66, the pins are positioned in the bores 73 such that the projections 77 are received in the lowermost detents 75. In this position, the pins 76 will be engaged by the lugs 66 to oscillate the blades 44 in the manner aforementioned. To render the pins inoperative, they are positioned such that the projections are received in detents 74 to hold the pins upwardly and out of engagement with the lugs 66.

The principal advantage of this modification is that the width of the push rods 68 is substantially reduced since no width thereof is necessary to effect adjustment of the pins from an operative to inoperative position with respect to the lugs 66 or vice versa. Accordingly, more push rods may be used to select, correspondingly, more recorded criterion. If desired, the projections 77 and detents 74 and 75 may be omitted without departing from the spirit and scope of this modification. In other words, the pins 76 may be conveniently inserted into the bores 73 when operative association of the blades 44 with lugs 66 is desired and the pin removed completely therefrom to be stored, thus rendering the blade inactive.

Figure 3:
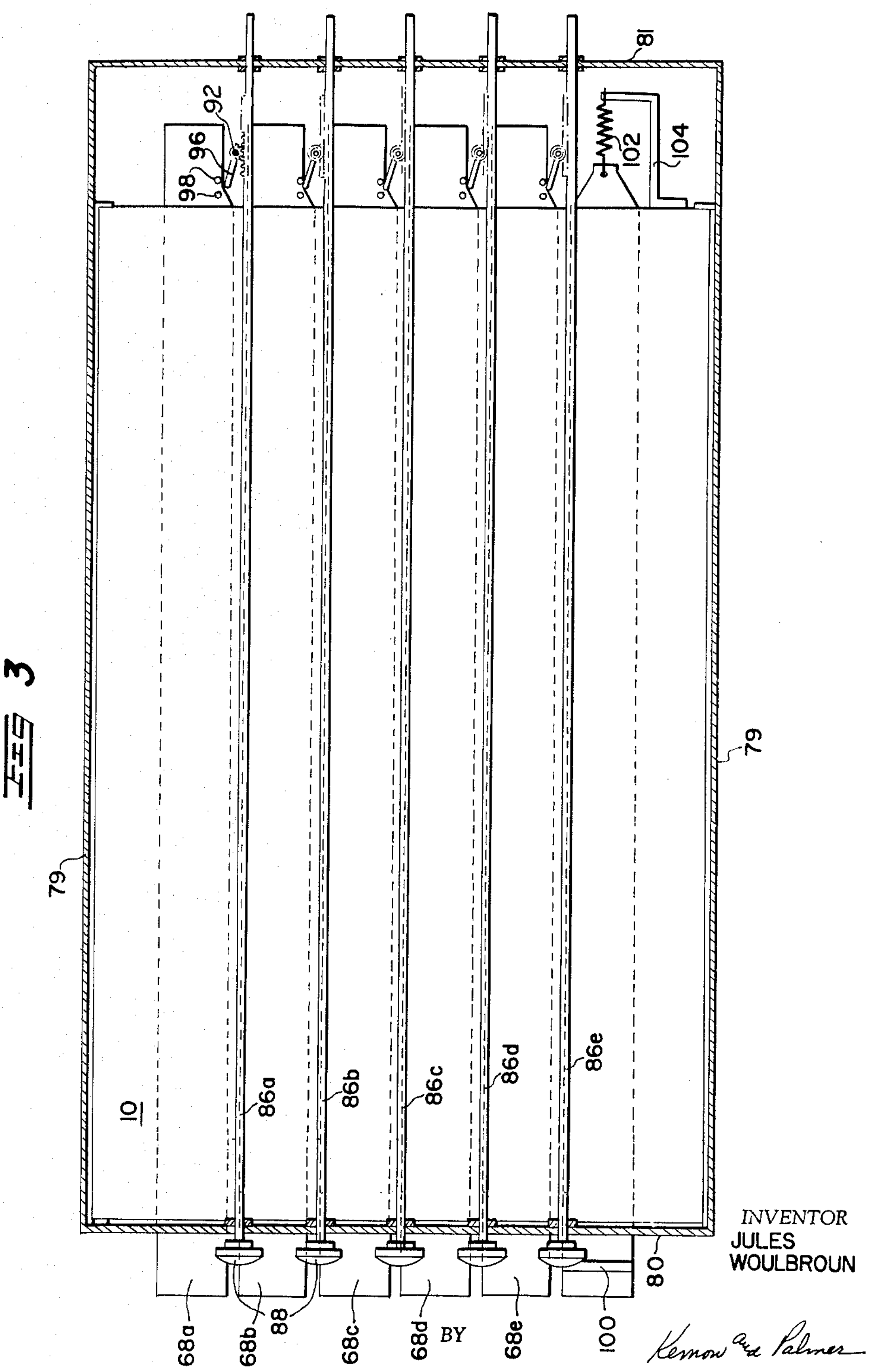
FIG. 3 is a cross sectional view taken along lines 3—3 of FIG. 2.
Figure 4:
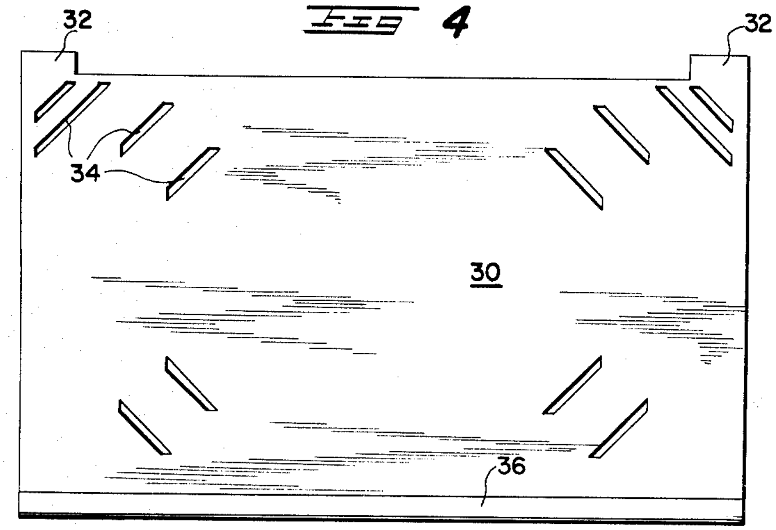
FIG. 4 is a plan view of a card holder adapted for use with the indicating apparatus of this invention.

As shown in FIGS. 2 and 3, an arrangement is provided for containing a plurality of card-holding trays 10 in a cabinet 78 and as well a mechanism for simultaneously actuating any particular one of the push rods 68 for all of the trays in the cabinet. The cabinet is of conventional construction and includes side walls 79, front and rear walls 80 and 81 respectively and a top 82.

Affixed to the cabinet sidewalls 79 and on the inside thereof are a plurality of spaced angular members 83 having stops 84 at the innermost end thereof for slidingly receiving each of the trays 10. A plurality of pull rods **86*a*, 86*b*, 86*c*, 86*d*, 86*e*, having knobs 88 on the forward end thereof, extend through apertures in the front and rear walls of the cabinet to enable sliding movement with respect thereto. Also, if desired, the respective knobs on the rods 86 may be colored to conform with the colors on the push rods 68 and actuating tabs 62**.

Each of the pull rods 86 is provided at its inner end with a rack 90 engageable with a pinion 91 non rotatably mounted at the upper portion of vertical rods **92*a*, 92*b*, 92*c*, 92*d* and 92*e* journaled at their lower end in the base of the cabinet (not shown), and at their upper end in the top of the cabinet 80 through bearings 94**.

At approximately the level of each tray 10 in the cabinet a radially extending lever 96 is keyed or otherwise mounted for rotation with each of the vertical rods 92. The rearward portion of the push rods 68 for each tray extends past the rear wall 20 thereof, and is provided with a pair of pins 98 arranged to be engaged by the levers 96. Thus, for example, it will be seen that a pulling action exerted upon or an outward movement of the rod **86*a* results in a clockwise rotation of the rods 92*a* and thus lever arms 96 thereon to effect inward movement of the push rods 68*a* for all trays simultaneously. In like manner, the remaining push rods 68** may be actuated.

Figure 12:
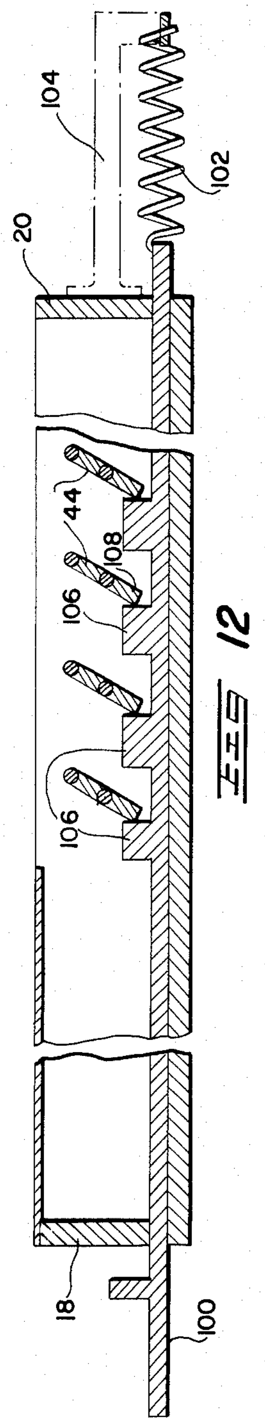
FIG. 12 is an enlarged fragmentary cross sectional elevation taken along lines 12—12 of FIG. 7.

To provide an indication of which trays sustain cards having the desired criteria recorded thereon corresponding to proper actuation of the pull rods 86, a master indicating signal arrangement is provided by this invention as best seen by reference to FIGS. 7 and 12 of the drawings. The indicating mechanism by which the operator is made aware that certain of the trays 10 in the cabinet contain cards having the desired criterion recorded thereon includes a sliding bar 100 extending through the front and rear walls of each tray 18 and 20 respectively, and urged to a rearward position under the influence of a helical tension spring 102 affixed at one end to the sliding bar 100 and at the other end to a bracket 104 mounted on the rear wall 20 of the tray 10. The bar 100 is generally similar to the construction of the push rods 68 insofar as its anchorage against the base of the tray is concerned and as well since it also is provided with a plurality of upstanding projections or lugs 106. However, the portion of the pivotal blind actuating blades 44 immediately over the position taken by the bars 100 in the trays 10 is formed having an immovable or integral depending portion 108 engageable with the upstanding lugs 106 on the bar 100 and, therefore, is non-adjustable between operative and inoperative association with the lugs 106.

Since the blind actuating blades 44 are restrained to either one of two positions by the detent springs 56, so long as only one of the blades is sloped rearwardly as indicated in FIG. 12, the bar 100 will be retained outwardly of the front wall 18 against the pull spring 102. Moreover, it will be remembered that so long as only one of the blinds is in a rearward position so as to expose at least one of the cards on the tray, the tray then contains at least one card which contains the desired criterion. Accordingly, the position of the bar 100 is outwardly of the front wall of the trays as indicated in FIG. 11. When, however, all of the blinds 38 are moved forwardly over the marginal edges of the cards 28, all of the blades 44 will be moved to a forward sloping position. Since there will be nothing in this instance to retain the bar 100 against the pull of spring 102, the bar 100 will move inwardly toward the rear of the tray, thus providing an operator with an indication that the particular tray has no cards on which is recorded the information desired, since the marginal edges of all cards therein are covered.

In use of the embodiment described, having the trays complete with card holders 30 and blinds 38 along with the operating mechanism aforementioned, and as well the cabinet 78, the operator or one who desires to use the apparatus of this invention begins by inserting the cards on which are recorded information peculiar to the business or other activity in which he is engaged, into the card holders. As each card is placed into each card holder 30 or as a change in the criteria recorded on the cards is incurred, the respective blind actuating tabs 62 corresponding thereto (or pins 76 if the modified form is used) are rendered operative or inoperative with respect to the push rods 68 depending on the particular information recorded on the card to which the blind actuated thereby applies. Generally, the adjustment is such that the blind actuating tabs are rendered operative with respect to the push rods 68 when the card corresponding thereto does not apply to some recorded criterion and inoperative with respect to the push rods when the card in fact does contain the particular criterion to which the particular blind actuating tab and push rod correspond.

Having thus adjusted the blind actuating tabs, the individual trays 10 are placed into the cabinet until the rear wall 20 abuts against the stop 84 at the rear of each shelf bracket 82. Upon placing the trays in the cabinet, the operator makes certain that all of the push rods 68 are in their forward-most position. By so doing, he is assured that the blinds of all cards are positioned rearwardly and accordingly expose their forward margins.

After the trays of cards have been so placed into the cabinet, and subsequently during the course of business the user desires to examine the cards, for example, of all clients in the eastern half of the United States who have paid, he proceeds by pulling rod **86*a* outwardly from the cabinet. This effects a clockwise rotation of the levers 96, which in turn engage the rearwardmost pin 98 on the push rods 68*a* for all of the trays 10 in the cabinet and simultaneously moves them rearwardly. Since the blind actuating tabs (or pins) for blinds covering all cards which do not relate to clients are in an operative position with respect to the push rods 68*a*, the blinds covering these cards will move forwardly over their margins, leaving the margins of all cards which apply to clients uncovered. Observing the master indicator signal bar 100 on each tray, the operator will known immediately which of the trays in the cabinet contains cards relating to clients by the position of the bar with respect to the front wall of the tray. As aforementioned, the bar 100 will remain forwardly so long as only one of the cards on its tray remains uncovered or pertains in this instance to clients. Thus, the operator can ignore all trays in which the operating bar 100** has moved rearwardly with respect to the tray or inwardly as compared with the front of the cabinet.

The operator then pulls pull rod **86*c* which similarly actuates all of the push rods 68*c* moving them rearwardly. This narrows down the number of cards whose margins are left exposed to some extent, eliminating all cards relating to clients in the western half of the United States in this instance, or, perhaps more accurately, eliminating the cards of all clients who are located in places other than the Eastern United States. Correspondingly, it may be possible that more trays will be ruled out as indicated by the master signal bars 100 thereon. Finally, the operator pulls rod 86*e* to effect rearward movement of the push rods 68*e* on all of the trays in the cabinet. Accordingly, this final action leaves the marginal edges of only those cards which pertain to clients located in the Eastern United States and who have paid exposed. Further, with respect to each tray, he can ignore all cards whose marginal edges have been covered by the blinds 38 and moreover can ignore all trays on which the master indicating signal bars 100** have been displaced inwardly.

Figure 19:
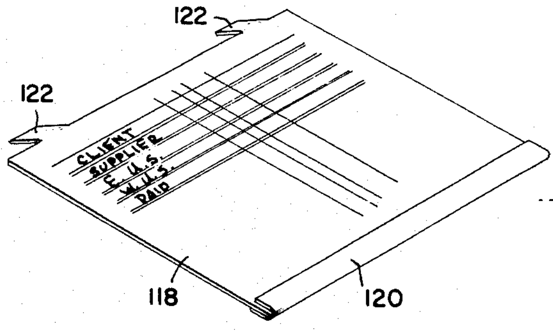
FIG. 19 is a perspective view of a card usable with the embodiment of FIG. 15.
Figure 20:
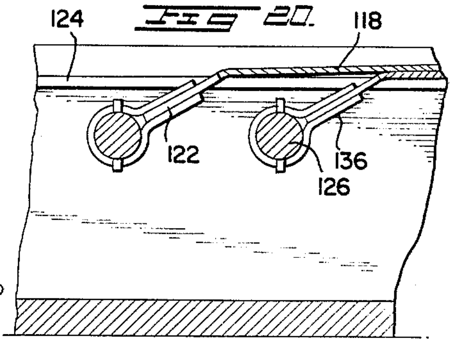
FIG. 20 is a cross-section taken along lines 20—20 of FIG. 18.

A modified embodiment of the invention is illustrated in FIGS. 15 through 20 of the drawings. The tray structure 110 adapted for use with this embodiment is most clearly depicted in FIGS. 15, 17 and 18, and like the embodiment of FIGS. 1 through 10, includes a front wall 112, rear wall (not shown), side walls 114, and a bottom 116. Again, a plurality of records in the form of cards 118 are pivotally mounted in the tray 110 in overlapping relation such that a forward marginal edge 120 is presented or exposed on each card. The details of the individual card usable with this embodiment of the invention are illustrated in FIG. 19 and as shown therein each card is formed having rearwardly extending tabs 122 for connection to an operating mechanism to be described below. While this specific form of card is suitable for use with this embodiment, it is to be understood that other forms may be used, for example, the cards may be mounted in card holders having tabs extending from the rearward edge thereof in a manner similar to that shown in FIGS. 4 and 5 of the drawings and referred to in the description of the first mentioned embodiment.

The visible indicating means by which card selection is effected in this embodiment is movement of the cards themselves from a position of initial alignment laterally to a position out of alignment, and for this reason, the cards are supported on shelves 124, projecting inwardly from the side walls 14, the outside limits of these shelves being sufficient to accommodate the required movement of the cards for the indicating function.

The indicating means by which card movement is effected includes further a laterally movable member 126 for each card extending transversely of the tray 110, having its ends slidably received in apertures 128 in the side walls 114 and preferably though not necessarily supported at spaced intermediate points by upstanding plates 129. To retain the member 126 in either its moved or unmoved position, annular recesses 130 and 131 are provided near at least one end thereof to be engaged by a spring detent 132 suitably anchored on the inner surface of the side walls 114, such as by nails 134. Connecting loops 136 are wrapped about the member 126 and relative movement between the loops and the member is restricted by pegs 138 and 139, though it is contemplated that other means might be used for this purpose; such as, for example, the loops 136 might be disposed in recesses in the members 126 or the like. The loops 136, in turn, are connected directly such as by a suitable adhesive to the tabs 122 extending from the rearward edge of the cards 118, as clearly shown in FIGS. 17, 18 and 20.

Card selecting devices in the form of rotatable rod-like members 140 extend longitudinally of the tray 110 and are journaled in the ends 112 thereof as well as being supported on transverse journal plates 142 positioned at intervals along the bottom 116 of the tray. The members 140 are provided at their forwardly extending end and exteriorly of the tray with knobs **144*a*, 144*b*, 144*c*, 144*d*, 144*e* respectively. The knobs correspond directly to the forward projecting portion of the push rods 68 in the embodiment of FIGS. 1 to 10 and for the sake of simplicity are labeled identically to those of the first mentioned embodiment. It will be understood, however, that the particular criterion to which each of the selecting devices 140** relates depends solely on the information stored on the cards forming the basis of selectivity.

Projecting radially from the rods 140 under each of the transversely movable members 126 and thus under each card, are lugs 146 and 148. Actuating means in the form of adjustably rotatable members 150 are fixed against sliding movement by engagement in recesses 151 on the transverse members 126 and formed having a depending lug or tab 152 as well as a visible reference tab 154 projecting radially in a generally upward direction. As shown most clearly in FIGS. 17 and 18, the actuating means may be adjusted such that the tabs or lugs 152 may be rotated upwardly into an inoperative position or downwardly into an operative position with respect to the radial lugs 146 on the rods 140.

Figure 15:
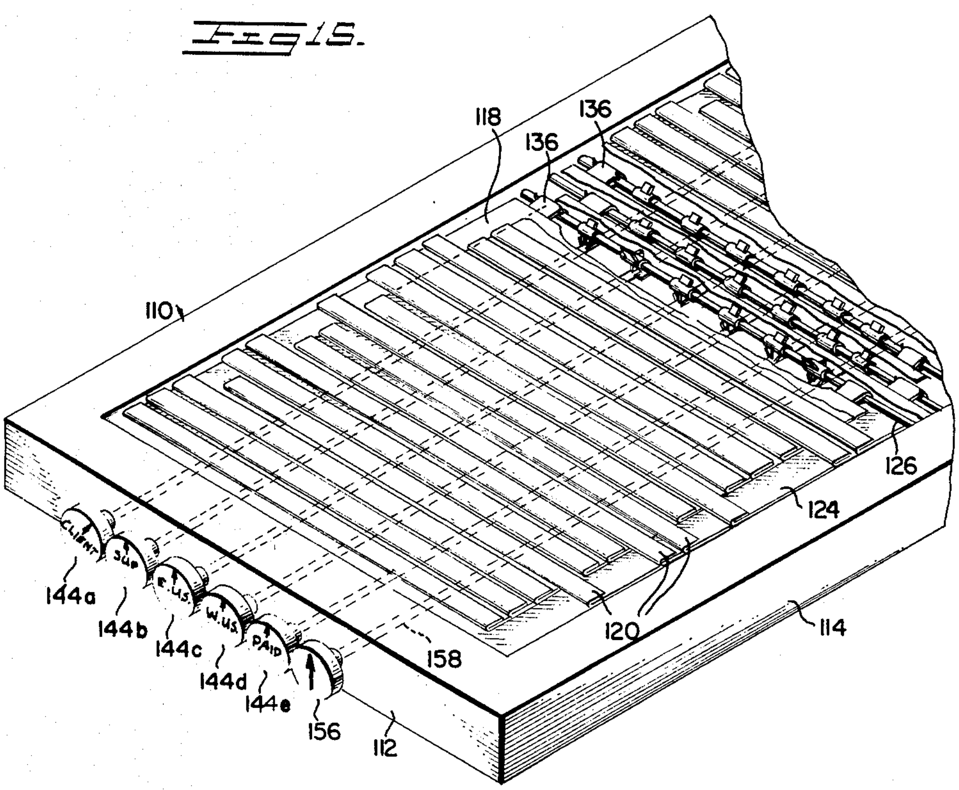
FIG. 15 is a fragmentary perspective view illustrating a modified embodiment of this invention.
Figure 16:
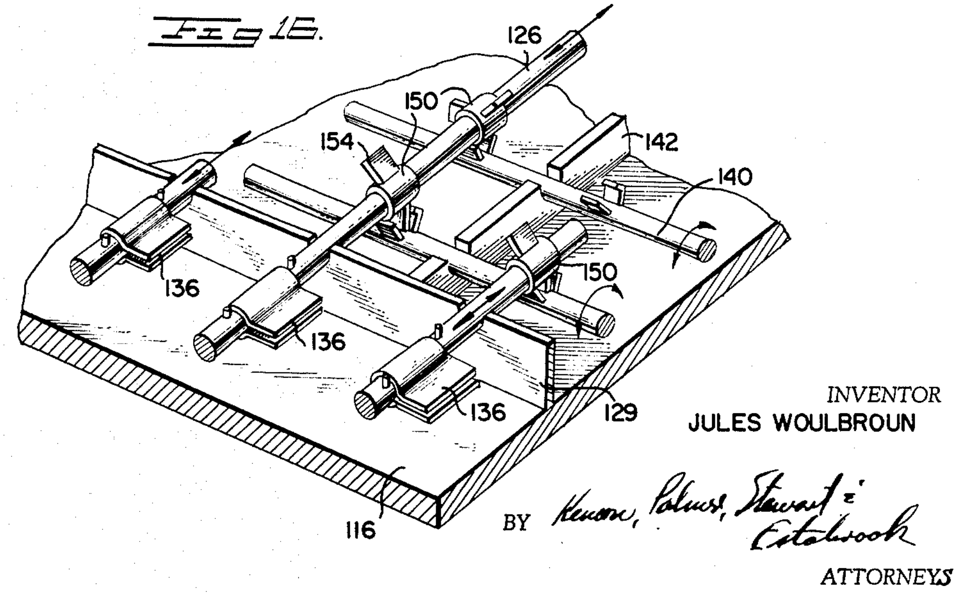
FIG. 16 is a fragmentary perspective view illustrating the basic operating components of the modification of FIG. 15.
Figure 17:
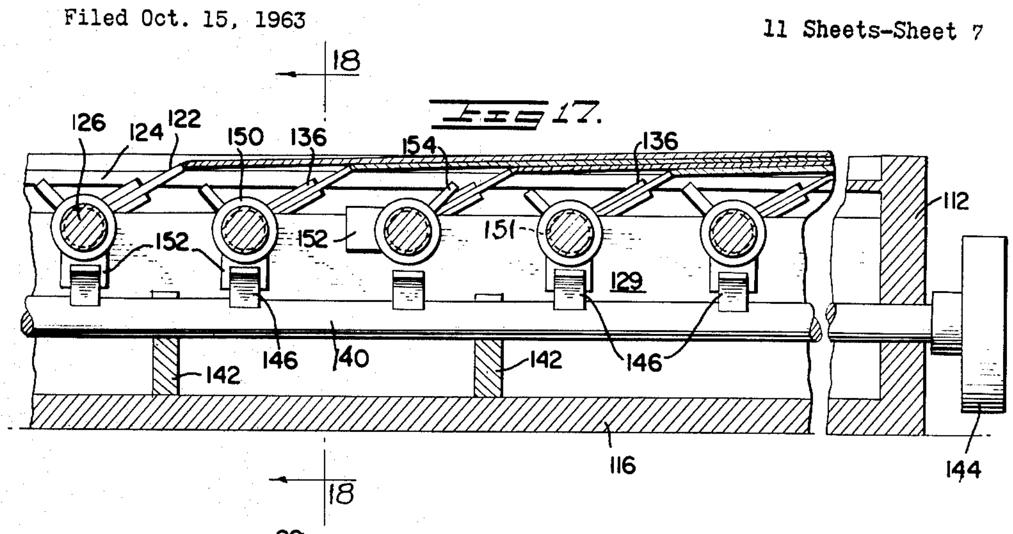
FIG. 17 is an enlarged fragmentary cross-sectional view of the embodiment of FIG. 15.
Figure 18:
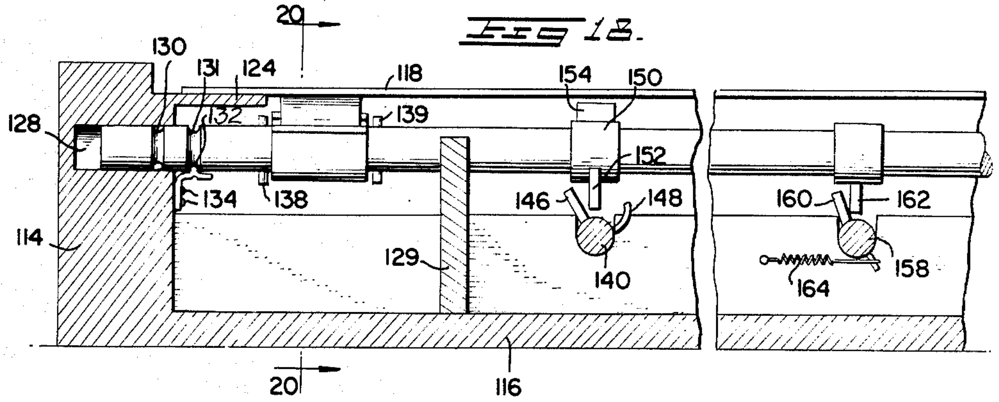
FIG. 18 is a fragmentary cross-section taken along lines 18—18 of FIG. 17.

The operation of this embodiment of the invention is generally similar to the embodiment illustrated in FIGS. 1 to 10. Thus, depending on the information recorded on the cards, the members 150 are adjusted to an operative or inoperative position for each card and for each selecting device. In other words, the depending lug 152 on each actuating means 150 will be upward or out of engagement with the lugs 146 on the selector rods 140 if the criterion to which the particular selector bar relates is in fact recorded on the card in question. For all other cards which do not record the criterion corresponding to the respective selector bars, the lugs 152 will be downward so as to be engaged by the lug 146 upon rotation of the appropriate rod 140. Carrying this basic principle of operation into practice, it will be seen that by clockwise rotation of the knobs 144, all the cards in the tray having information recorded thereon other than that to which the selector device turned relates will be moved by engagement of the lug 146 with the depending lug 152 latterly from their position of initial alignment or as shown in FIG. 15, to the right, leaving to the left, in their initial position those cards having the desired information recorded thereon. The displaced cards may be reutrned after the selection operation by counterclockwise rotation of the rods 140 and engagement of the lugs 148 thereon with the depending lugs 152.

To provide an indication of whether the tray actually contains a card having a particular information criterion recorded thereon, an indicator device is provided including a knob 156 mounted on the end of a longitudinally extending rotary rod 158, having a series of radially projecting lugs 160. The lugs 160 are in engagement with depending lugs 162 fixed to the transversely movable member 126, and further, a tension spring 164 is arranged to bias the rod 158 rotatably in a clockwise direction as viewed in FIG. 18. Since a set of lugs 160 and 162 is provided for each card in the tray, so long as one of the cards remains to the left, the rod 158 is prevented from turning, thereby providing an indication that a card exists in the tray which remains unmoved, and therefore having the desired informational criterion recorded thereon. However, should all the cards in the tray be moved to the right on actuation of any or all of the selecting devices, then nothing will remain to retain the rod against the bias of the spring 164 and it will rotate to indicate the absence of a card in the tray having the desired information thereon. As explained with respect to the first mentioned embodiment, this feature is particularly desirable for use in cabinets.

Figures 21, 22:
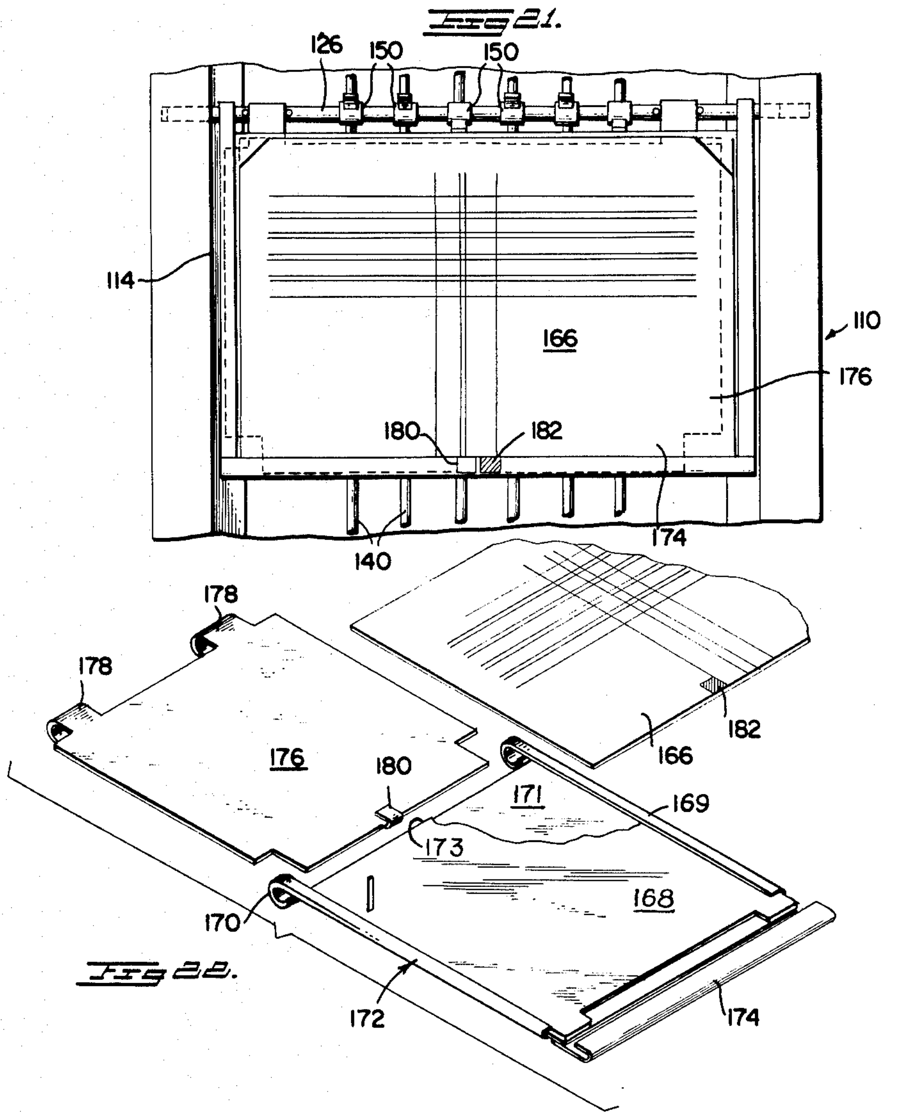
FIG. 21 is a fragmentary plan view illustrating a further modified embodiment of this invention.
FIG. 22 is an exploded perspective view of a card assembly usable with the embodiment of FIG. 21.
Figure 23:
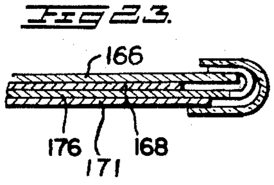
FIG. 23 is an enlarged, fragmentary cross-sectional view of the assembly shown in FIG. 22.

A further modified embodiment of this invention is illustrated in FIGS. 21 through 23 of the drawings. The same operating mechanism described with respect to FIGS. 15 through 20 is used in this embodiment and accordingly, identical elements in these embodiments are identified by the same reference numerals. It will be noted, however, in this embodiment that the records are in the form of index cards 166 mounted in a conventional holder 168. The holder is assembled by means of side strips 169 having rearwardly extending loops 170 with a backing sheet 171 to form a pocket 172 open along its rearward edge 173. The forward edge of the pocket is closed by a doubled back lip 174 of transparent material such as cellophane or the like. Positioned within the pocket 172 is a slidable blind 176 having rearwardly extending tabs 178, and a forwardly disposed indicating tab 180.

In this embodiment, the pockets 172 and thus the card holders 168 are pivotally mounted by way of the connecting loops 170 to the transversely movable members 126, but in this instance, the width of the card holders is such that no movement thereof can take place laterally in the trays as in the embodiment of FIGS. 15 to 20. In place of the card connection to the connecting loops 136, the tabs 178 on the blinds 176 are suitably affixed so that the blind 176 is carried with the movable transverse member 126. To facilitate the indicating function, a colored spot 182 is provided on the card 166 at the forward or exposed marginal edge thereof under the marginal portion 174 on the holder 168. Then, initially the indicating tab 180 is positioned to the left of the colored portion 182 and moved by manipulation of the selecting mechanism over the spot 182. Thus, and in view of the descriptions of operation given above with respect to the other embodiments of this invention, it will be understood that the card indicating function may be effectively and completely carried out.

It is contemplated that the individual trays of the modified embodiments of FIGS. 15 to 20 and 21 to 23 of the drawings may be adapted for use in cabinets similarly as the embodiment shown in FIGS. 1 to 14. As will be apparent to one skilled in the art from the foregoing description, the rotatable rods 140 may be extended through the back of the trays and carry, for example, bevel gears at their ends. The selecting rod carried bevel gears, in turn, may engage or mesh with bevel gears carried on vertical rods in the rear of the cabinet similar to the rods 92 in FIGS. 2 and 3. These rods, of course, would be actuated from a master selector on the cabinet corresponding to the numbers 88 in the first-mentioned embodiment and in this manner, the respective indicating and selection functions carried out as described.

A still further modified embodiment of the invention is illustrated in FIGS. 24 through 44 of the drawings. This particular embodiment differs from the afore-described versions of the invention in that it operates on superposed stacked perforated cards mounted in a suitable holder. A primary distinction between the embodiment of these figures and the preceding embodiments of the invention is that the actuating means corresponding to each card is embodied in the card itself and the marginal area of the selected cards extend beyond the remaining cards only when moved by mechanical displacement of these actuating means.

Figures 24, 25, 26, 28, 44:
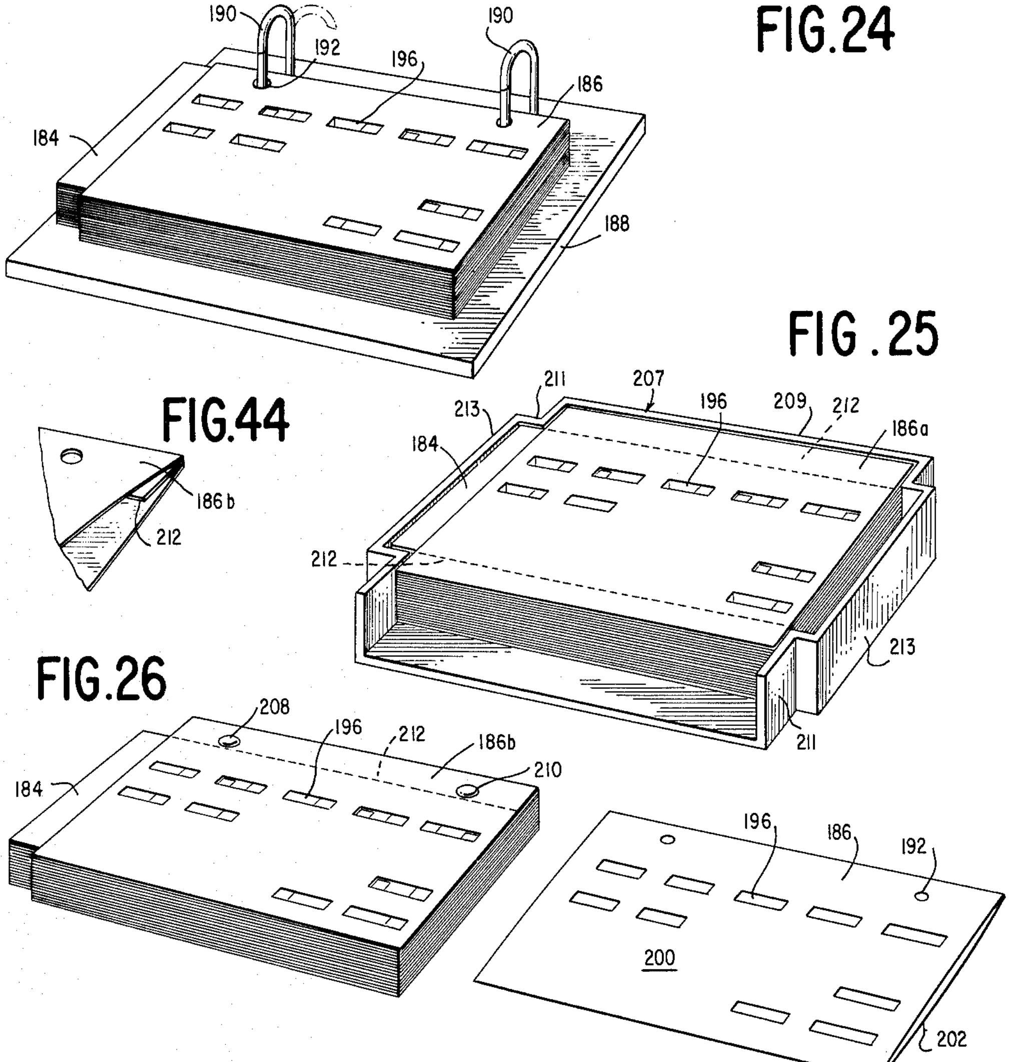
FIG. 24 is a perspective view of another embodiment of the invention showing a stack of super-posed record cards mounted on a ring binder-type of holder.
FIG. 25 is a perspective view showing the cards of FIG. 24 slightly modified for use and disposed in a box-type holder.
FIG. 26 is a perspective of the cards of FIG. 24 slightly modified for use in a bound-type holder.
FIG. 28 is an envelope for the cards of FIG. 24 through 26.
Fig. 44 is an enlarged perspective view partly broken away of the envelopes of Fig. 26 showing a detail thereof.

Referring specifically to FIG. 24, cards 184, enclosed by interposed blind envelopes 186 as shown are mounted on ring binder 188. Rings 190, disposed through apertures 192 in the envelopes and slots 194 (FIG. 30) in the cards, hold the cards and envelopes in the binder. The rings may be of any type standard in the art, such, for example, as wicket-type rods cut at the top and having one-half of the ring swingable on its axis to provide easy opening for the removal of the cards as shown. Of course any of the other standard snap-ring openers, hinged rings or the like may be used without varying the practice of the invention.

Perforations 196 are provided through both faces of envelope 186 as shown. These apertures may be disposed in any desired pattern as long as they are identically disposed in each of the respective envelopes. In a preferred embodiment the apertures are disposed in aligned rows and columns over the entire face of the card as partially shown in the figures.

In a manner similar to the apertures of envelopes 186, cards 184 have perforations 198 (FIG. 30) disposed therethrough. Perforations 198 are disposed in an identical pattern to perforations 196 in the envelopes. The perforations 198 vary in configuration from the perforations 196 of the cards in a manner to be described below.

Referring now to FIG. 28, envelope 186 is shown in perspective. The envelope consists of forward face 200 and rearward face 202. These envelopes are formed, preferably, by fabricating a suitable paper or plastic in a tubular shape of the proper diameter, flattening the tube and then punching the necessary apertures and perforations therethrough. Each card, 184, is provided with an envelope and is inserted between faces 200 and 202. The envelopes provide individual sliding surfaces for each card to allow displacement of any single card without displacement of the adjacent cards by frictional engagement therewith.

Figure 29:
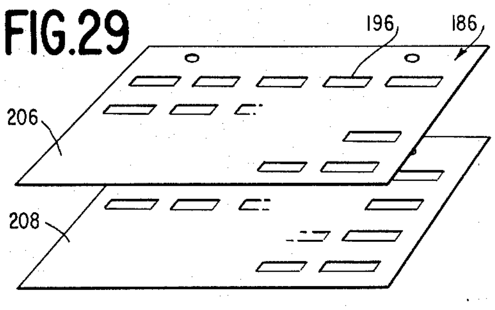
FIG. 29 is a perspective of a variation of the envelope of FIG. 28.

Referring now to FIG. 29, a variation of the enveloping structure shown in FIG. 28 is shown. This variation comprises spacer cards 206 and 208 having perforations 196 disposed therethrough. This variation serves the same purpose and functions in a manner similar to the envelope of FIG. 28.

Referring to FIG. 25, alternate holding means comprising an open box-like rack shown generally at 207 retains cards 184 and envelopes **186*a*. Envelopes 186*a* differ from envelopes 186 (FIG. 24) in that they are of increased transverse height and provide upper and lower margins extending beyond the upper and lower edges of cards 184 as shown. Rack 207 is provided with back walls 209 and side walls 211 formed to hold envelopes 186*a* in a super-posed stacked condition. Walls 211 are provided with recesses 213 therein, the recesses being formed to receive cards 184** as shown, when they are longitudinally moved.

Referring now to FIG. 26, a further variation of the holding means for the cards is shown. Envelopes **186*b* differ from the envelopes 186 of FIG. 24 in that they have an increased transverse height to provide an upper marginal portion in the envelope. This embodiment further incorporates binding pins 208 and 210 disposed through the upper marginal portions of the envelopes. The binding may, of course, be of any type known in the art, such, for example, as adhesive bindings, stapled bindings or the like. Envelope 186*b* is preferably provided, in the upper margin thereof, with guide insert 212 to maintain proper alignment of cards 184 within the envelope. Referring to FIG. 44 for detail, guide member 212 is shown disposed in the upper edge of the envelope 186*b*. The member may be secured within the envelope by any suitable means such, for example, as adhesive, staples, or the like. Envelope 186*a* shown in FIG. 25 may also incorporate similar guide members 212** within both the upper and lower margins thereof for these same purposes.

Figure 27:
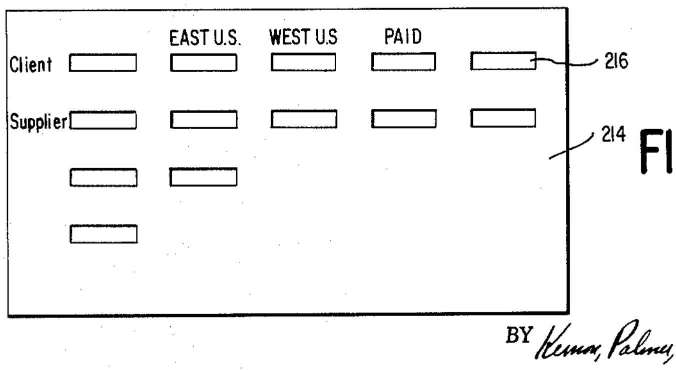
FIG. 27 is a plan view of an indicator card for use with the cards of the embodiment shown in FIGS. 24 through 26.

FIG. 27 is an indicator card 214 suitable for use with any of the variations of the embodiments of the invention in FIGS. 24 through 44. It is provided with apertures 216 which are disposed through the card in the pattern of the record cards and envelopes described above. This card, through intelligence printed thereon, provides an indication of the type of information available in each of the perforations of the cards when it is superposed on a stack of record cards. The operation of this feature of the invention will be described in more detail below.

Figure 30:
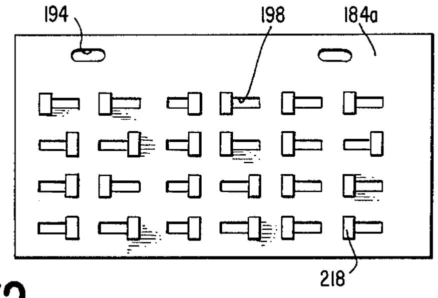
FIG. 30 is a plan view of a record card embodying the invention.
Figure 31:
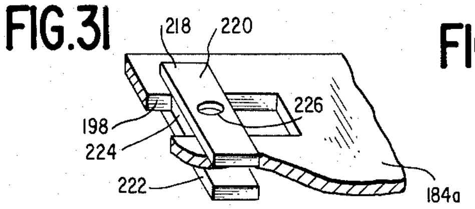
FIG. 31 is an enlarged perspective detail partly broken away of the embodiment of FIG. 30.

Turning now to FIG. 30, one of the means for varying the information stored in each of the cards is shown. The means of this figure comprises movable segments 218 disposed in card perforations 198 and slidable therealong. Referring to FIG. 31 for detail, these movable segments are made up of face member 220 and back member 222 connected together through perforation 198 by intermediate member 224. The face and back members retain the intermediate member in the perforation yet permit slidable movement to either end thereof. Segments 218 may, of course, be made integral of plastic or the like, may be fabricated from separate portions of flat stock cemented together or in any other fashion which provides a structure suitable for the purpose. Depression 226 is formed in the upper face of member 220 for purposes to be described later.

Figure 32:
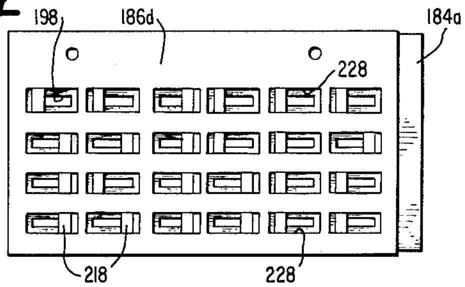
FIG. 32 is a plan view of the embodiment of FIG. 30 showing the addition of the card envelope for use with this device.

Referring to FIG. 32, the embodiment of FIG. 30 incorporating the movable segments is shown enclosed in a modified envelope **186*d*. In this envelope, the wall thickness thereof is preferably equal to the thickness of members 220 and 222 (FIG. 31). Slots 228, equal in height to the height of members 220 and 222 (FIG. 31) are cut out and disposed in a pattern identical to the perforations 198 in card 184. This configuration provides protection from inter-engagement of the movable segments of the respective stacked cards. In addition to envelope 186*d*, another envelope, similar to that shown in FIG. 28, may be provided thereon if desired. The invention may also incorporate very thin, smooth members 220 and 222 (FIG. 31) made of spring steel or the like and biased to remain flat on the surfaces of the card. In this case, envelope 186*d* (FIG. 32) may be omitted and the standard envelope 186** (FIG. 28) may be used.

Figure 33:
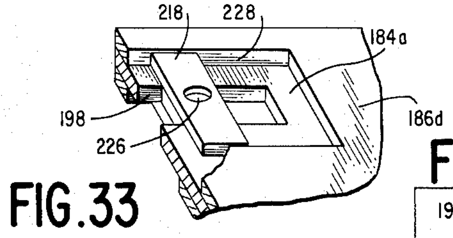
FIG. 33 is an enlarged perspective detail partly broken away of a portion of FIG. 32.

Referring to FIG. 33, the relationship between slot 228 and movable segment 218 is shown in detail.

Figures 34, 35, 36:
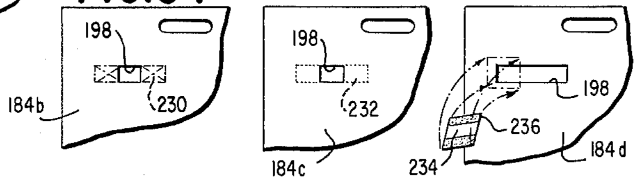
FIG. 34 is an enlarged detail partly broken away of another record card embodying the invention.
FIG. 35 is a view similar to FIG. 34 showing another card embodying the invention.
FIG. 36 is a view similar to FIG. 34 showing another card embodying the invention.
Figure 37:
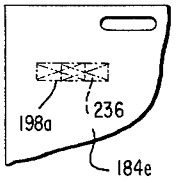
FIG. 37 is a view simialr to FIG. 34 showing still another card embodying the features of this inventon.

FIGS. 34 through 37 are various alternate methods and structure for varying the location of the apertures 198 on each of the cards. In FIG. 34, card **184*b* is provided with perforations 198 therethrough. This perforation is preferably one-third the length of perforations 196 (FIGS. 28 and 29) and has, printed on either side thereof, spaces 230 indicating where further punching of the card may be made. The embodiment of FIG. 35 shows aperture 198 identical to that of FIG. 34 having scored areas 232 disposed on either side thereof. In this embodiment the location of the perforation may be adjusted by tearing the desired scored portion 232 out. In the embodiment of FIG. 36, the perforation 198 is of equal length to the perforation of envelope 196 (FIGS. 28 and 29) and tab 234 may be disposed as desired to alter the location of the perforation. The tab may be attached by suitable adhesive strips 236, cemented, or any other suitable method of connection to the card. Preferably the adhesive 236 is of the multi-use type such as rubber cement so that tab 234 may be moved a number of times as desired. FIG. 37 shows another variation of the information recording portion of the invention and incorporates a printed rectangle 198*a* thereon. This rectangle is preferably equal in length to envelope perforation 196 (FIGS. 28 and 29) and may be divided, by printing, in two equal segments 236, the segments being equal to two-thirds of the total length of perforation 196**. These segments provide indication for punching to provide a desired location of the perforation.

Figure 38:
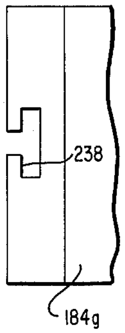
FIG. 38 is a plan view of one end of a card embodying the invention partly broken away showing a marginal detail thereof.
Figure 39:
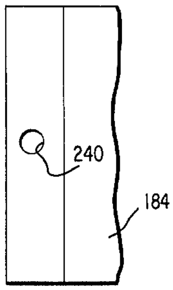
FIG. 39 is a view similar to FIG. 38 showing a variation in the marginal detal of the card.

Referring now to FIGS. 38 and 39 of the drawings, further modifications incorporated in the end margins of the card are shown. In operation of the device, it may be desirable to retain or remove selected or non-selected cards as desired. Slot 23 (FIG. 38) and aperture 240 (FIG. 39) are provided in the ends of cards **184*g* and 184*f*** respectively to enable retention or withdrawal of cards as desired. The operation of these features will be described below.

Figure 40:
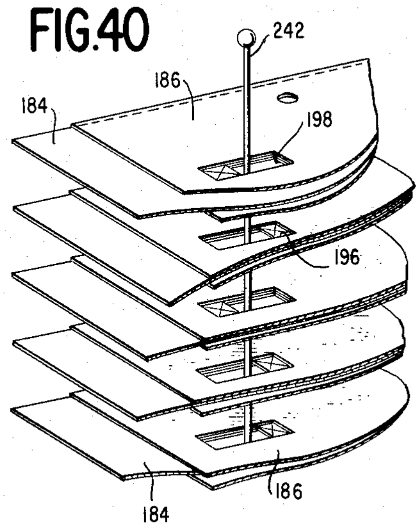
FIG. 40 is an enlarged perspective exploded view partly broken away of cards embodying the invention showing the operation thereof.

FIG. 40 is an illustration to aid in the description of the operation of the invention and shows cards 184 enclosed in envelopes 186 disposed in an exploded stacked relationship. An actuator pin 242 is shown inserted through the perforations in the envelopes and cards in operative position.

In the operation of the device as thus far described, the lateral location of the perforations of the cards are selected to indicate the presence or absence of desired information on the cards. For example, referring to FIG. 27, the upper left-hand perforation furnishes information as to whether a card contains information relating to a client or not. The perforation below the client perforation would indicate whether the card held information relating to a supplier or not. The second row of perforations indicates whether or not the client or supplier is located in the Eastern United States or not, while the third row indicates whether or not the client or supplier is in the Western United States. Similarily the next row indicates whether or not the client or supplier has paid or not.

In the embodiment of FIG. 30, all movable segments 218 are initially disposed at the right-hand end of the perforations 198 while the remainder of the variations of FIGS. 34 through 37 are initially as shown. Referring specifically now to FIG. 30, the information, in this embodiment, is placed on card by suitable disposition of movable segment 218 at the time of posting. Assuming that the card is to contain information relating to a client, the card would have the movable segment 218 moved to the leftmost portion of the upper-left hand perforation. A supplier, conversely, would have the movable segment in perforation directly below the client perforation moved to the leftmost end of that perforation. Continuing further with the location of the movable segments 218 to reflect the required information, the cards would then be stacked within the envelopes as shown in exploded view in FIG. 40. Assuming that the client cards are desired, pin 242 is inserted through the center of the upper left-hand perforations in the envelopes and cards. Pin 242 is moved to the right extreme of apertures 196 in the envelopes to provide selection of the cards. Since the client cards have movable segments 218 disposed at the left in the perforations, the client cards will not be moved. The cards in which segment 218 have not been moved will be moved by engagement between the pin and segment 218 so that the right-hand margin of those cards extends from the stack. In like manner, if the client is an Eastern United States client, the member 218 in the perforation corresponding to East United States in the top row will have been moved to the left as before and similar actuation through the use of pin 242 and the second most row of perforations will move all but Eastern United States clients to the right. This can be combined with as many types of information as desired, as described in the prior embodiments of the invention. In the embodiment of FIG. 30, and as shown in FIGS. 31 and 33, depressions 226 are provided in the upper surface 220 of segment 218 and facilitate, through the use of a pin (not shown) or the like, the movement of the segment from one extreme to the other in perforation 198 at the time of recording of the information on the card.

The embodiments of FIGS. 34 through 37 work in a similar manner to that described above. However, FIGS. 34, 35 and 37, once the information is entered on the card by punching, tearing or the like, the card must be replaced if the information subsequently changes. In the embodiment of FIG. 36, however, the tab may be moved by merely lifting the tab from the card surface and moving it to the desired location. There could, of course, be a subsequent use of the tab of FIG. 36 with the embodiments of FIGS. 34 through 37 if the information did change.

Figure 41:
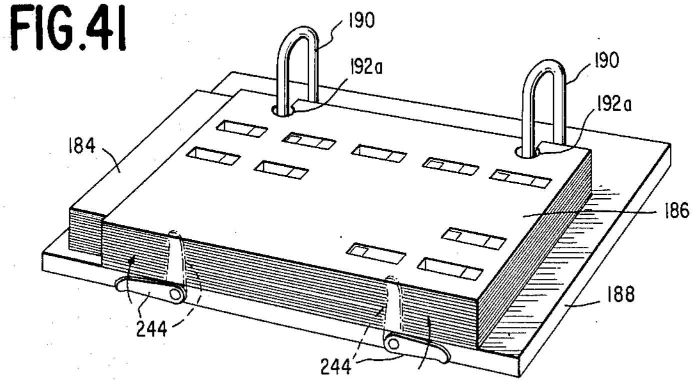
FIG. 41 is a perspective view of the device of FIG. 24 showing a variation thereof.

In FIG. 41, an additional feature is incorporated on the ring binder 188 of FIG. 24. Due to the loose fit generally required between the pages of a ring binder and the binder rings, misalignment of the pages of the binder can occur. This would be detrimental to the operation of this inventiton since close alignment is required. To avoid this problem, card aligner 224 is hingedly mounted on binder 188 as shown and serves, when elevated in the direction indicated by the arrow to align the cards and envelops prior to operation of the device.

Figure 42:
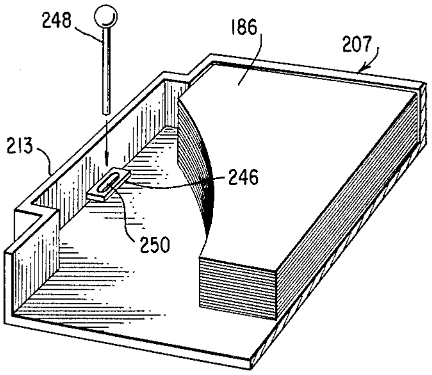
Fig. 42 is a perspective view of one end of the device of Fig. 25 partly broken away, showing a variation thereof.

In FIG. 42 a permanent card retaining device is shown incorporated in racks 207 of the type shown in FIG. 25. This device comprises bracket 246, mounted on sidewall recess 213 as shown. Pin 248 is insertable through opening 250. By using cards such as those shown in FIGS. 38 and 39, cards in the left-most position may be retained by insertion of pin 248 through slot 238 (FIG. 38) or aperture 240 (FIG. 39) and opening 250 (FIG. 42) while the remaining cards are removed.

Figure 43:
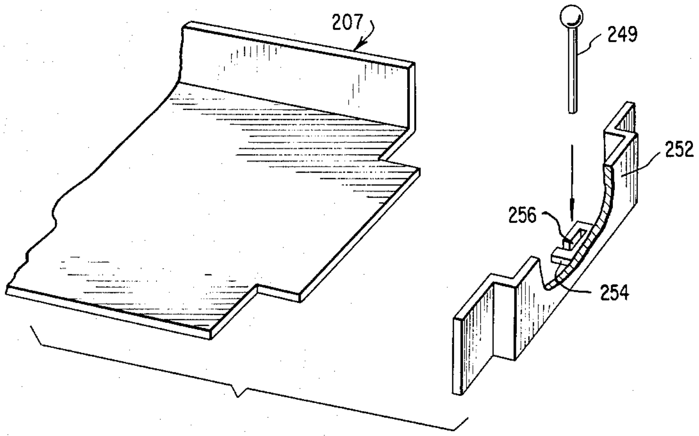
Fig. 43 is a view similar to Fig. 42 showing a further variation to the opposite end of the embodiment of Fig. 25.

FIG. 43 illustrates a further variation to the rack of FIG. 25. The right side of rack 207 is provided with removable wall 252 which, in turn, has bracket 254 mounted thereon. This feature is intended for use with the device of FIG. 42 and cards having the features of FIG. 30 or 40 in both ends thereof. With this device, desired cards are retained as described in the operation of the device of FIG. 42, while unwanted cards may be removed by insertion of pin 249 through slots 238 (FIG. 39) or apertures 240 (FIG. 39) of cards moved to the right hand recess and slot 256 in bracket 254. Removal of wall 252 then withdraws the moved cards from the stack while the unmoved cards are retained by pin 248 (FIG. 42).

The present invention, therefore, described in the foregoing specification, provides extremely effective information retrieval devices and mehtods which are particularly suitabe for use with card filing systems of the described types. In one of the embodiments, the new apparatus not only makes it possible to quickly and easily retrieve information stored in individual card trays, but moreover, in larger business operations, from multiple trays of cards arranged in cabinets. The card selecting systems of this invention are readily adapted to a variety of informational criterion that may be desired to form the basis of card selectivity. Accordingly, the new devices fill a gap in the field of information retrieval between the crude card sorting systems of the prior art and the highly expensive and complicated electronic devices which are currently being developed and used.

The unique arrangements referred to above, as well as many other features inherent in the new and improved card selecting apparatus of this invention, as can be seen completely fill the aforementioned objectives, and a generally enhance the state of this art. It is to be further understood that since many possible changes can be made in the card selecting apparatus of this invention without in any way departing from the spirit and scope thereof as defined in the appended claims.

I claim:

1. Information storage and retrieving means comprising:

a plurality of records adapted to have information criterion and subcriterion stored thereon, at least one selecting device correspondable to informational criterion and subcriterion to be stored on said records, an indicator means for each of said records, said indicator means comprising a telltale and an interposed blind member associated with each of said records, said interposed member and said telltale being relatively movable with respect to each other to provide an indicating change in the visibility of said telltale, and a selectively locatable actuating means correspondable to said selecting device, said actuating means being disposed to engage said selecting device to connect said selecting device with said indicator means for all records except those storing informational criterion and subcriterion to which said selecting device corresponds, the actuating means operatively connecting said selecting device with said indicator means cooperating with said selecting device to provide relative movement between the telltale and interposed member of said indicator means.

2. Information storage and retrieving apparatus comprising:

a plurality of records adapted to have informational criteria and subcriteria stored thereon;

at least one selecting device corresponding to an information criterion to be stored on said records;

at least one selecting device corresponding to an informational subcriterion to be stored on said records;

a single movable indicator means for each of said records; and an adjustable actuating means corresponding to each of said selecting devices each of said actuating means being disposed to engage one of said selecting devices to connect that selecting device with said indicator means for all records except those storing informational criterion and subcriterion to which said selecting devices respectively correspond.

3. Information storage and retrieving apparatus comprising:

a tray;

a plurality of cards adapted to have information recorded thereon, said cards being mounted on said tray and arranged in horizontal overlapping relation so that a portion of each is exposed to view;

indicating means for each of said cards, each of said indicating means including a movable member extending transversely of said tray under said cards respectively;

at least one selecting device extending substantially perpendicularly past each of said transversely extending movable members, said selecting device corresponding to an informational criterion recorded on said cards;

and actuating means adjustably positioned on each of said transversely extending movable members each of said actuating means being disposed to engage said selecting device to connect that selecting device to the transversely extending movable members for all cards except those having recorded therein, informational criterion to which said selecting device corresponds.

4. Information storing and retrieving apparatus comprising:

a tray;

a plurality of cards having information recorded thereon, said cards being hingedly mounted on said tray in overlapping relation and each presenting an exposed marginal edge;

a slidable blind positioned over each of said cards, said blind normally exposing the marginal edge thereof;

a blade member extending transversely of said tray under each of said cards, said blade members being pivotable about their lower edges and each having their upper portions connected to each of said blinds;

at least one rod extending longitudinally of said tray and movably positioned therein under said blade members, said rod conforming to a predetermined informational criterion recorded on said cards;

a plurality of upstanding lugs on said rod, each of said lugs being positioned for operative association with each of said blades; and means for rendering said blade members pivotable upon movement of said rods and said lugs thereon, said means being adjustable to operative and inoperative positions, whereby actuation of said rod effects pivotal movement of certain of said blade members and movement of blinds connected thereto depending upon the position of said adjustable means, to cover at least a portion of the marginal edges of all cards but those having recorded thereon, criterion corresponding to the rod moved.

5. Information storage and retrieving apparatus comprising:

a cabinet;

a plurality of trays in said cabinet;

a plurality of cards carried on each of said trays in overlapping relation to present an exposed marginal edge;

a plurality of blinds in each of said trays;

pivotal members in said trays for moving said blinds over at least part of the marginal edges of all cards but those recording the desired criterion; and means for indicating those trays which carry cards having the desired criterion recorded thereon, said indicating means including a slidable bar longitudinally disposed in each of said trays and extending past the forward edge thereof, said bar being held forwardly by said blade members when any one of said marginal edges is uncovered by said blinds, and means to move said bar rearwardly when the marginal edges of all cards in a respective tray are covered.

6. Information storage and retrieving apparatus comprising:

a cabinet;

a plurality of trays in said cabinet;

a plurality of cards carried on each of said trays so that a portion of each card is exposed to view;

indicating means for each said cards, said indicating means including a movable member extending transversely of said trays and under said cards; and means for indicating those trays which carry cards having the desired information stored thereon, said last-mentioned means including a movable member extending longitudinally of each of said trays and operably connected to each of said transversely extending members, said longitudinally extending member being held in an initially unmoved position by said transversely extending members; and means to move said longitudinally extending member out of its initial position upon movement of all transversely extending members in a respective tray.

7. Information storing and retrieving apparatus comprising:

a plurality of records positioned uniformly with respect to each other and adapted to have informational criteria and subcriteria thereon;

at least one selecting device corresponding to an informational criterion stored on said records at least one selecting device corresponding to an information subcriterion stored on said records;

a plurality of selectively movable indicator means initially positioned uniformly with respect to each other, one of said indicator means corresponding to each of said records, and an adjustable actuating means for each of said selecting devices, said actuating means being disposed to engage that selecting device to connect the indicator means for all cards to said selecting devices respectively except for those records storing the respective informational criterion and subcriterion to which said devices correspond, for movement out of their initial uniform positions upon movement of said selecting devices, first said indicator means corresponding to all of said records except those having informational criterion thereon desired to be retrieved and secondly, said indicator means remaining and corresponding to all of said records except those having the desired informational subscriterion thereon.

8. Information storage and retrieving apparatus comprising:

a tray;

a plurality of cards adapted to have information recorded thereon, said cards being mounted on said tray so that a portion of each is exposed to view;

indicating means for each of said cards, each of said indicating means including a movable member extending transversely of said tray under said cards respectively and a movable blind connected to each of said transversely extending movable members;

at least one selecting device extending substantially perpendicularly past each of said transversely extending movable members, said selecting means corresponding to an informational criterion recorded on said cards; and actuating means adjustably positioned on each of said transversely extending movable members said actuating means disposed to engage said selecting device to connect that selecting device to the transversely extending movable members for all cards except those having information recorded therein, informational criterion to which said selecting device corresponds.

9. Information storage and retrieving apparatus comprising:

a tray;

a plurality of cards adapted to have information recorded thereon, said cards being movably mounted in said tray initially uniform with respect to each other and arranged so that a portion of each is exposed to view;

indicating means for each of said cards, each of said indicating means including a movable member extending transversely of said tray under said cards respectively, said cards being attached to said transversely extending movable member for movement therewith;

at least one selecting device extending substantially perpendicularly past each of said transversely extending movable members, said selecting device corresponding to an informational criterion recorded on said cards; and actuating means adjustably positioned on each of said transversely extending movable members said actuating means being disposed to engage said selecting device to connect that selecting device to the transversely extending movable members for all cards except those having recorded thereon, information criterion to which said selecting device corresponds.

10. Information storage and retrieving apparatus comprising:

a plurality of records adapted to have informational criteria thereon and positioned uniformly with respect to each other in overlapping position such that a marginal portion of each record is exposed;

at least one selecting device corresponding to an informational criterion stored on said records;

a plurality of selectively movable indicator means initially positioned uniformly with respect to each other, one of said indicator means corresponding to each of said records and each of said indicator means including a blind movable to cover at least part of said marginal portion; and actuating means disposed to engage said selecting device to connect the indicator means for all cards to said selecting device except those storing information to which said device corresponds for moving out of their initial uniform positions, said indicator means corresponding to all of said records except those having information thereon desired to be retrieved.

11. Information storing and retrieving apparatus comprising:

a plurality of records positioned uniformly with respect to each other and adapted to have informational criteria thereon;

at least one selecting device corresponding to an informational criterion stored on said records;

a plurality of selectively movable indicator means initially positioned uniformly with respect to each other, one of said indicator means corresponding to each of said records, said records being attached for movement with said indicator means whereby movement of said records provides a visable indication of selected records;

an actuating means disposed to engage said selecting device to connect the indicator means for all cards to said selecting device, except those storing information to which said device corresponds for moving out of their initial uniform positions, said indicator means corresponding to all of said records except those having information thereon desired to be retrieved.

12. Information storing and retrieving apparatus comprising:

a plurality of records disposed in overlapping relation such that a marginal portion of each record is exposed;

a movable blind over each of said records and normally positioned to expose said marginal portion; and means for moving said blinds over at least part of the marginal portions of all records except those having the desired information thereon, said means including a blade member pivotally mounted at its lower edge and connected at its upper portion to said blind, at least one movable rod extending perpendicularly to said blade members, and means for rendering said blade members pivotally upon movement of said rod, said last-mentioned means being adjustable to operative and inoperative positions.

13. An information storage and retrieving means comprising:

a container;

a plurality of cards adapted to have information recorded thereon, said cards being mounted in said container and arranged in stacked superposed relation;

means engaging said cards to retain said cards in a superposed condition to permit movement thereof in a single direction;

indicating means on each of said cards, each of said indicating means comprising a telltale and an interposed blind member between each of said cards, said interposed member covering said telltale when said cards are in the superposed condition, said means engaging said cards also engaging said interposed member to restrain movement thereof in all directions co-planar thereto;

each of said cards and said interposed members having a plurality of identically disposed perforations therethrough, the respective perforations on each of said cards and said interposed members that are identically disposed with respect to one another comprising a set of perforations, said set of perforations corresponding to informational criterion and subcriterion recorded on said cards;

at least one selecting device insertable in a set of perforations, said selecting means being laterally movable in said set of perforations; and actuating means selectively locatable on said card perforations said actuating means being disposed to engage the selecting device when it is moved laterally for all cards except those having recorded thereon informational criterion and subcriterion to which said set of perforations corresponds, the location of said actuating means on said perforation corresponding to the existance of the informational criterion and subcriterion in said card, the actuation means which engages said selecting device cooperating with said selecting device to move said card with respect to said interposed member to expose the telltale thereof, the exposed telltale thereby providing a visual indication of the absence on the card thereof of informational criterion and subcriterion to which said set of perforations correspond.

14. An information storage and retrieving means comprising:

a container;

a plurality of cards adapted to have information recorded thereon, said cards being mounted in said container and arranged in stacked superposed relation, said cards having longitudinal axis thereto;

means engaging said cards to retain said cards in superposed condition in all directions except a direction parallel to said longitudinal axis;

indicating means on each of said cards, each of said indicating means comprising a telltale disposed on one card edge perpendicular to said longitudinal axis and an interposed blind member between each of said cards covering said telltale, said interposed members being in stacked superposed relation to one another, said means engaging said cards also engaging said interposed member to restrain movement thereof in all directions co-planar thereto;

each of said cards and said interposed members having a plurality of identically disposed perforations therethrough, the respective perforations on each of said cards and said interposed members that are identically disposed with respect to one another comprising a set of perforations, said set of perforations corresponding to informational criterion and subcriterion recorded on said cards, said perforations defining elongated slots with the longer dimensions thereof parallel to said longitudinal axis;

at least one selecting pin insertable in a set of perforations, said selecting pin being movable in said set in the longitudinal direction toward said telltale; and actuating means selectively locatable on each of said perforations said actuating means being disposed to engage the selecting pin when it is moved therein for all cards except those having recorded thereon informational criterion and subcriterion to which said set of perforations corresponds, the longitudinal location of said actuating means on said perforation corresponding to the existence of the informational criterion and subcriterion on said card, the actuating means which engage said selecting pin cooperating with said selecting pin to move said card longitudinally with respect to said interposed member to expose the telltale thereof, the exposed telltale thereby providing a visual indication of the absence on the card thereof of informational criterion and subcriterion to which said set of perforations corresponds.

15. A means in accordance with claim 14 wherein said container comprises a looseleaf ring binder, said means engaging said cards comprises the rings of said binder disposed through longitudinal slots in said card, and the means engaging said interposed member comprises the rings of said binder disposed through circular holes in said interposed means.

16. A means in accordance with claim 14 wherein said container comprises an open box, said means engaging said cards comprises at least one longitudinal wall of said box, said interposed means being greater in transverse height than said cards, and said means engaging said interposed member comprises the transverse walls of said box, said transverse wall having indentations therein to provide clearance for longitudinal movement of said cards.

References Cited by the Examiner

UNITED STATES PATENTS

| | | | |
|---|---|---|---|
| 1,361,494 | 12/1920 | Rich | 129—16.1 |
| 1,858,219 | 5/1932 | Hutchings | 129—16.7 |
| 1,925,705 | 9/1933 | Robinson | 312—319 |
| 1,964,837 | 7/1934 | Warren | 129—16.1 |
| 2,109,820 | 3/1938 | Desaubliaux | 129—16.1 |
| 2,331,471 | 10/1943 | Holleck | 129—16.1 |
| 2,342,361 | 2/1944 | Niclas | 129—16.1 X |
| 2,395,924 | 3/1946 | Wade | 312—183 X |
| 3,556,232 | 6/1951 | Stiller | 129—16.1 |

FRANK B. SHERRY, *Primary Examiner.*

CHANCELLOR E. HARRIS, *Examiner.*